US007454343B2

(12) United States Patent
Hirose et al.

(10) Patent No.: US 7,454,343 B2
(45) Date of Patent: Nov. 18, 2008

(54) SPEECH SYNTHESIZER, SPEECH SYNTHESIZING METHOD, AND PROGRAM

(75) Inventors: Yoshifumi Hirose, Kyoto (JP); Takahiro Kamai, Kyoto (JP); Yumiko Kato, Osaka (JP); Natsuki Saito, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 11/783,855

(22) Filed: Apr. 12, 2007

(65) Prior Publication Data

US 2007/0203702 A1 Aug. 30, 2007

Related U.S. Application Data

(63) Continuation of application No. PCT/JP2006/009288, filed on May 9, 2006.

(30) Foreign Application Priority Data

Jun. 16, 2005 (JP) ............................ 2005-176974

(51) Int. Cl.
*G10L 15/14* (2006.01)

(52) U.S. Cl. ........................ 704/256; 704/258; 704/260

(58) Field of Classification Search ................. 704/260, 704/258, 261, 263, 266, 267, 270, 271, 256, 704/268, 269
See application file for complete search history.

(56) References Cited

U.S. PATENT DOCUMENTS

| | | | | |
|---|---|---|---|---|
| 6,665,641 | B1 * | 12/2003 | Coorman et al. | 704/260 |
| 2003/0187651 | A1 | 10/2003 | Imatake | |

FOREIGN PATENT DOCUMENTS

| | | |
|---|---|---|
| JP | 5-016498 | 3/1993 |
| JP | 8-063187 | 3/1996 |
| JP | 9-062295 | 3/1997 |
| JP | 10-247097 | 9/1998 |
| JP | 2000-181476 | 6/2000 |
| JP | 2002-268660 | 9/2002 |
| JP | 2003-295880 | 10/2003 |

OTHER PUBLICATIONS

Toshimitsu Minowa et al., "Inritsu no Vector o Riyo shita Onsei Gosei Hoshiki" (Prosody Control Based on A Vector of Pitch Interval and Power for Waveform Concatenation Synthesis), National Institute of Advanced Industrial Science and Technology, May 19, 2000, vol. 100, No. 97, SP2000-4, pp. 25-31.

Toshiyuki Sano et al., "Onso Setsuzokugata Onsei Gosei to Yokuyo Henkan Gijutsu no Yugo ni yoru Shizen na Gosei Onsei no Kakutoku" (Getting Smooth Computer Voice through Concatenation Speech Synthesis with Intonation Transfer), Omron Technics, Jan. 15, 2000, vol. 39, No. 4, pp. 324-329.

* cited by examiner

*Primary Examiner*—Huyen X. Vo
(74) *Attorney, Agent, or Firm*—Wenderoth, Lind & Ponack, L.L.P.

(57) ABSTRACT

A speech synthesizer that provides high-quality sound along with stable sound quality, including: a target parameter generation unit; a speech element DB; an element selection unit; a mixed parameter judgment unit which determines an optimum parameter combination of target parameters and speech elements; a parameter integration unit which integrates the parameters; and a waveform generation unit which generates synthetic speech. High-quality and stable synthetic speech is generated by combining, per parameter dimension, the parameters with stable sound quality generated by the target parameter generation unit with speech elements with high sound quality and a sense of true speech selected by the element selection unit.

10 Claims, 19 Drawing Sheets

Ci-1=(1,1,1,0,0,0 0) Ci=(1,1,0,0,0,0 0)

(Difference between Ci-1 and Ci = 1) < Predetermined threshold

When S = (A1, A2, A3, B1, B2, C1, C2)

(a) S = (1, 1, 1, 0, 0, 0, 0)

(b) S = (1, 0, 0, 0, 1, 0, 0)

(c) S = (0, 0, 0, 0, 1, 0, 1)

(d) S = (0, 0, 1, 0, 0, 0, 1)

SPEECH SYNTHESIZER, SPEECH SYNTHESIZING METHOD, AND PROGRAM

CROSS REFERENCE TO RELATED APPLICATION(S)

This is a continuation application of PCT application No. PCT/JP2006/09288 filed May 09, 2006, designating the United States of America.

BACKGROUND OF THE INVENTION (1) Field of the Invention

The present invention relates to a speech synthesizer that provides synthetic speech of high and stable quality.

(2) Description of the Related Art

As a conventional speech synthesizer that provides a strong sense of real speech, a device which uses a waveform concatenation system in which waveforms are selected from a large-scale element database and concatenated has been proposed (for example, see Patent Reference 1: Japanese Laid-Open Patent Publication No. 10-247097 (paragraph 0007; FIG. 1)). FIG. 1 is a diagram showing a typical configuration of a waveform concatenation-type speech synthesizer.

The waveform concatenating-type speech synthesizer is an apparatus which converts inputted text into synthetic speech, and includes a language analysis unit 101, a prosody generation unit 201, a speech element database (DB) 202, an element selection unit 104, and a waveform concatenating unit 203.

The language analysis unit 101 linguistically analyzes the inputted text, and outputs phonetic symbols and accent information. The prosody generation unit 201 generates, for each phonetic symbol, prosody information such as a fundamental frequency, duration time length, and power, based on the phonetic symbol and accent information outputted by the language analysis unit 101. The speech element DB 202 stores pre-recorded speech waveforms. The element selection unit 104 is a processing unit which selects an optimum speech element from the speech element DB 202 based on the prosody information generated by the prosody generation unit 201. The waveform concatenating unit 203 concatenates the elements selected by the element selection unit 104, thereby generating synthetic speech.

In addition, as a speech synthesis device that provides stable speech quality, an apparatus which generates parameters by learning statistical models and synthesizes speech is known (for example, Patent Reference 2: Japanese Laid-Open Patent Publication No. 2002-268660 (paragraphs 0008 to 0011; FIG. 1)). FIG. 2 is a diagram showing a configuration of a speech synthesizer which uses a Hidden Markov Model (HMM) speech synthesis system, which is a speech synthesis system based on a statistical model.

The speech synthesizer is configured of a learning unit 100 and a speech synthesis unit 200. The learning unit 100 includes a speech DB 202, an excitation source spectrum parameter extraction unit 401, a spectrum parameter extraction unit 402, and an HMM learning unit 403. The speech synthesis unit 200 includes a context-dependent HMM file 301, a language analysis unit 101, a from-HMM parameter generation unit 404, an excitation source generation unit 405, and a synthetic filter 303.

The learning unit 100 has a function for causing the context-dependent HMM file 301 to learn from speech information stored in the speech DB 202. Many pieces of speech information are prepared in advance and stored as samples in the speech DB 202. As shown by the example in the diagram, the speech information adds, to a speech signal, labels (arayuru (“every”), nuuyooku (“New York”), and so on) that identify parts, such as phonemes, of the waveform. The excitation source spectrum parameter extraction unit 401 and spectrum parameter extraction unit 402 extract an excitation source parameter sequence and a spectrum parameter sequence, respectively, per speech signal retrieved from the speech DB 202. The HMM learning unit 403 uses labels and time information retrieved from the speech DB 202 along with the speech signal to perform HMM learning processing on the excitation source parameter sequence and the spectrum parameter sequence. The learned HMM is stored in the context-dependent HMM file 301. Learning is performed using a multi-spatial distribution HMM as parameters of the excitation source model. The multi-spatial distribution HMM is an HMM expanded so that the dimensions of parameter vectors make different allowances each time, and pitch including a voiced/unvoiced flag is an example of a parameter sequence in which such dimensions change. In other words, the parameter vector is one-dimensional when voiced, and zero-dimensional when unvoiced. The learning unit performs learning based on this multi-spatial distribution HMM. More specific examples of label information are indicated below; each HMM holds these as attribute names (contexts).

- phonemes (previous, current, following)
- mora position of current phoneme within accent phrase
- parts of speech, conjugate forms, conjugate type (previous, current, following)
- mora length and accent type within accent phrase (previous, current, following)
- position of current accent phrase and voicing or lack thereof before and after
- mora length of breath groups (previous, current, following)
- position of current breath group
- mora length of the sentence Such HMMs are called context-dependent HMMS.

The speech synthesis unit 200 has a function for generating read-aloud type speech signal sequences from an arbitrary piece of electronic text. The linguistic analysis unit 101 analyzes the inputted text and converts it to label information, which is a phoneme array. The from-HMM parameter generation unit 404 searches the context-dependent HMM file 301 based on the label information outputted by the linguistic analysis unit 101, and concatenates the obtained context-dependent HMMs to construct a sentence HMM. The excitation source generation unit 405 generates excitation source parameters from the obtained sentence HMM and further based on a parameter generation algorithm. In addition, the from-HMM parameter generation unit 404 generates a sequence of spectrum parameters. Then, a synthesis filter 303 generates synthetic speech.

Moreover, the method of Patent Reference 3 (Japanese Laid-Open Patent Publication No. 9-62295 (paragraphs 0030 to 0031; FIG. 1)) can be given as an example of a method of combining real speech waveforms and parameters. FIG. 3 is a diagram showing a configuration of a speech synthesizer according to Patent Reference 3.

In the speech synthesizer of Patent Reference 3, a phoneme symbol analysis unit 1 is provided, the output of which is connected to a control unit 2. In addition, a personal information DB 10 is provided in the speech synthesis unit, and is connected with the control unit 2. Furthermore, a natural speech element channel 12 and a synthetic speech element channel 11 are provided in the speech synthesizer. A speech element DB 6 and a speech element readout unit 5 are provided within the natural speech element channel 12. Similarly, a speech element DB 4 and a speech element readout unit 3 are provided within the synthetic speech element channel 11. The speech element readout unit 5 is connected with the speech element DB 6. The speech element readout unit 3 is connected with the speech element DB 4. The outputs of the speech element readout unit 3 and speech element readout unit 5 are connected to two inputs of a mixing unit 7, and output of the mixing unit 7 is inputted into an oscillation control unit 8. Output of the oscillation control unit 8 is inputted into an output unit 9.

Various types of control information are outputted from the control unit 2. A natural speech element index, a synthetic voice element index, mixing control information, and oscillation control information are included in the control information. First, the natural speech element index is inputted into the speech element readout unit 5 of the natural speech element channel 12. The synthetic speech element index is inputted into the speech element readout unit 3 of the synthetic speech element channel 11. The mixing control information is inputted into the mixing unit 7. The oscillation control information is inputted into the oscillation control unit 8.

This method is used as a method to mix synthetic elements based on parameters created in advance with recorded synthetic elements; in this method, natural speech elements and synthetic speech elements are mixed in CV units (units that are a combination of a consonant and a vowel, which correspond to one syllable in Japanese) while temporally changing the ratio. Thus it is possible to reduce the amount of information stored as compared to the case where natural speech elements are used, and possible to obtain synthetic speech with a lower amount of computation.

However, with the configuration of the above mentioned conventional waveform concatenation-type speech synthesizer, only speech elements stored in the speech element DB 202 in advance can be used in speech synthesis. In other words, in the case where there are no speech elements resembling the prosody generated by the prosody generation unit 201, speech elements considerably different from the prosody generated by the prosody generation unit 201 must be selected. Therefore, there is a problem in that the sound quality decreases locally. Moreover, the above problem will become even more apparent in the case where a sufficiently large speech element DB 202 cannot be built.

On the other hand, with the configuration of the conventional speech synthesizer based on statistical models (Patent Reference 2), synthesis parameters are generated statistically based on context labels for phonetic symbols and accent information outputted from the linguistic analysis unit 101, by using a hidden Markov model (HMM) learned statistically from a pre-recorded speech database 202. It is thus possible to obtain synthetic voice of stable quality for all phonemes. However, with statistical learning based on hidden Markov models, there is a problem in that subtle properties of each speech waveform (microproperties, which are subtle fluctuations in phonemes which affect the naturality of the synthesized speech, and so on) are lost through the statistical processing; the sense of true speech in the synthetic speech decreases, and the speech becomes lifeless.

Moreover, with the conventional parameter integration method, mixing of the synthetic speech element and the natural speech elements is used temporally in intervals, and thus there is a problem in that obtaining consistent quality over the entire time period is difficult, and the quality of the speech changes over time.

An object of the present invention, which has been conceived in light of these problems, is to provide synthetic speech of high and stable quality.

SUMMARY OF THE INVENTION

The speech synthesizer of the present invention includes: a target parameter generation unit which generates target parameters on an element-by-element basis from information containing at least phonetic symbols, the target parameters being a parameter group through which speech can be synthesized; a speech element database which stores, on an element-by-element basis, pre-recorded speech as speech elements that are made up of a parameter group in the same format as the target parameters; an element selection unit which selects, from the speech element database, a speech element that corresponds to the target parameters; a parameter group synthesis unit which synthesizes the parameter group of the target parameters and the parameter group of the speech element by integrating the parameter groups per speech element; and a waveform generation unit which generates a synthetic speech waveform based on the synthesized parameter groups. For example, the cost calculation unit may include a target cost determination unit which calculates a cost indicating non-resemblance between the subset of speech elements selected by the element selection unit and the subset of target parameters corresponding to the subset of speech elements.

With such a configuration, it is possible to provide synthetic speech of high and stable quality by combining parameters of stable sound quality generated by the target parameter generation unit with speech elements that have a high sense of natural speech and high sound quality selected by the element selection unit.

In addition, the parameter group synthesis unit may include: a target parameter pattern generation unit which generates at least one parameter pattern obtained by dividing the target parameters generated by the target parameter generation unit into at least one subset; an element selection unit which selects, per subset of target parameters generated by the target parameter pattern generation unit, speech elements that correspond to the subset, from the speech element database; a cost calculation unit which calculates, based on the subset of speech elements selected by the element selection unit and a subset of the target parameters corresponding to the subset of speech elements, a cost of selecting the subset of speech elements; a combination determination unit which determines, per element, the optimum combination of subsets of target parameters, based on the cost value calculated by the cost calculation unit; and a parameter integration unit which synthesizes the parameter group by integrating the subsets of speech elements selected by the element selection unit based on the combination determined by the combination determination unit.

With such a configuration, subsets of parameters of speech elements that have a high sense of natural speech and high sound quality selected by the element selection unit are optimally combined by the combination judgment unit based on a subset of plural parameters generated by the target parameter pattern generation unit. Thus, it is possible to generate synthetic speech of high and stable quality.

With the speech synthesizer of the present invention, it is possible to obtain synthetic speech of high and stable quality by appropriately mixing speech element parameters selected from a speech element database based on actual speech with stable sound quality parameters based on a statistical model.

Further Information about Technical Background to this Application

The disclosure of Japanese Patent Application No. 2005-176974 filed on Jun. 16, 2005 including specification, drawings and claims is incorporated herein by reference in its entirety.

The disclosure of PCT application No. PCT/JP2006/309288 filed, May 09, 2006, including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENTS

Embodiments of the present invention shall be described hereafter with reference to the drawings.

First Embodiment

Figure 1:
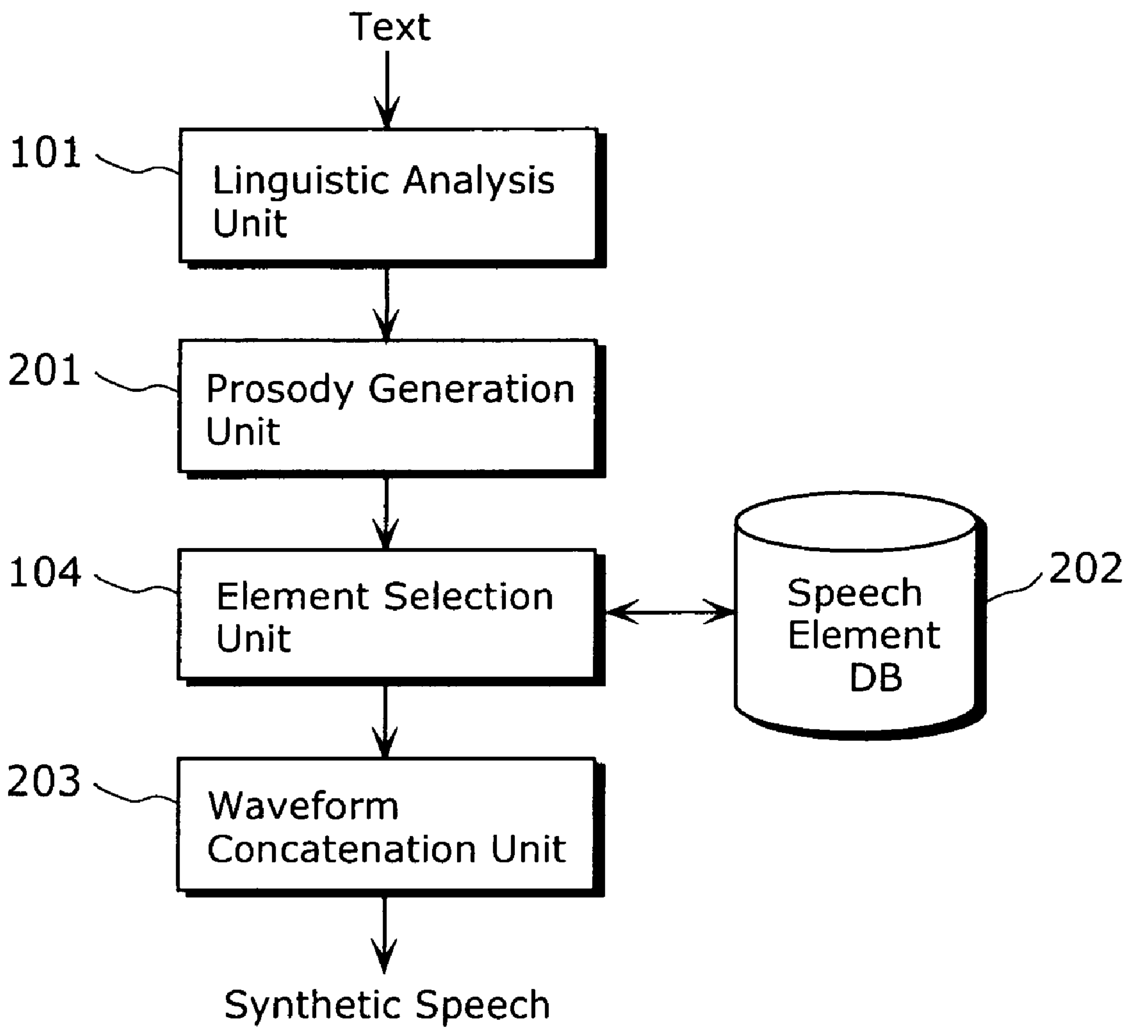
FIG. 1 is a diagram showing a configuration of a conventional waveform concatenation-type speech synthesizer.
Figure 2:
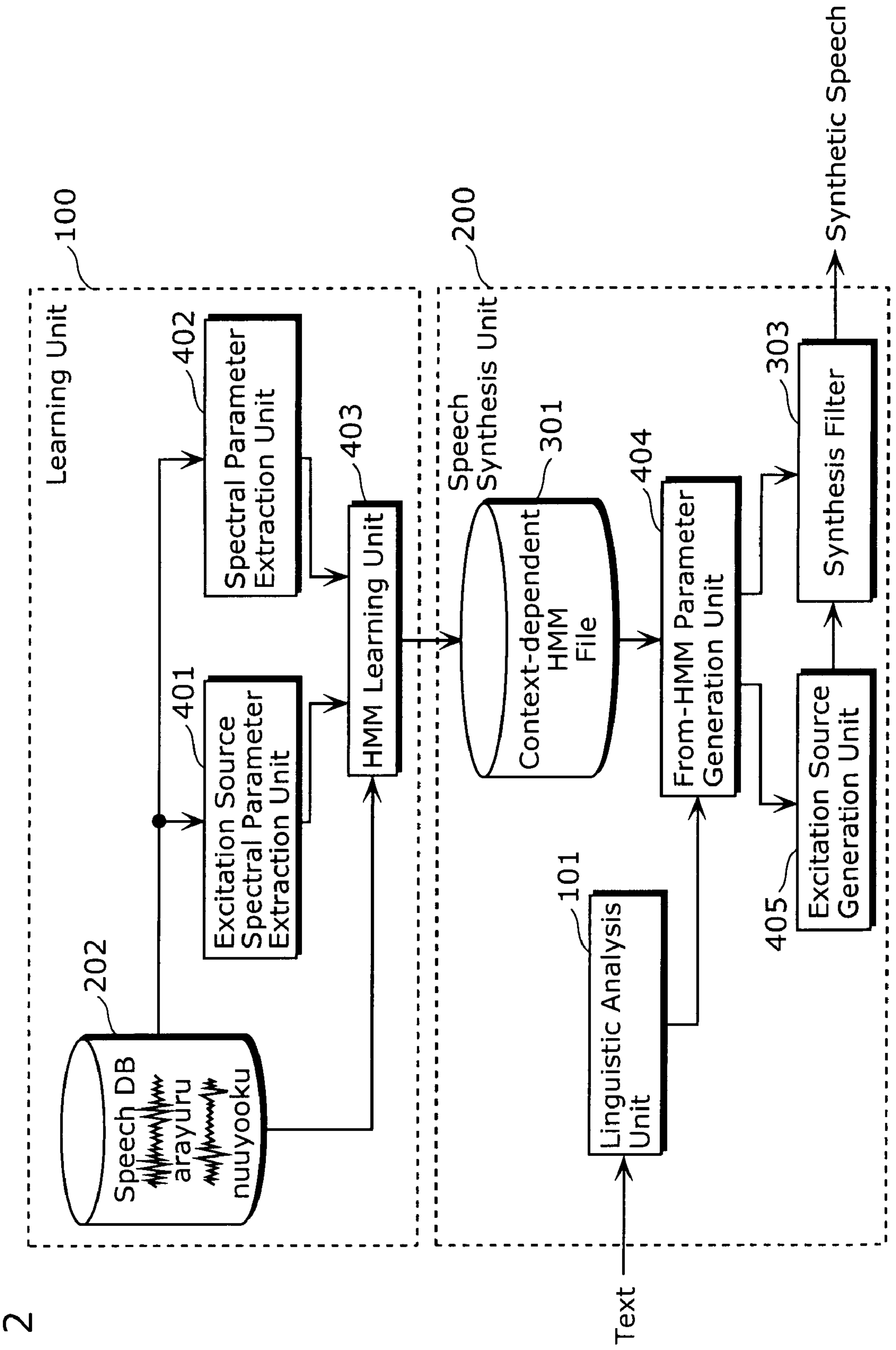
FIG. 2 is a diagram showing a configuration of a conventional speech synthesizer based on a statistical model.
Figure 3:
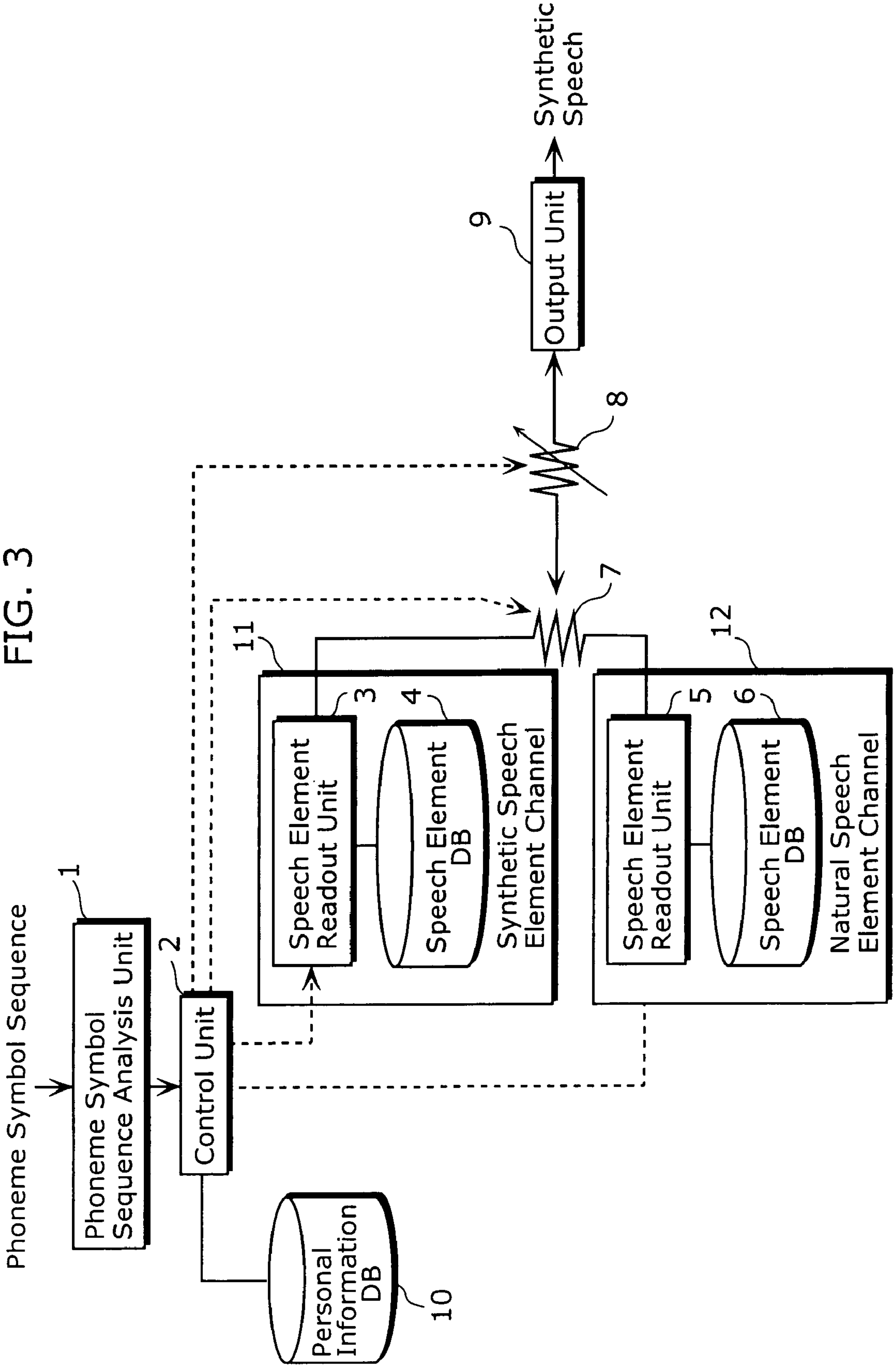
FIG. 3 is a diagram showing a configuration of a conventional parameter integration method.
Figure 4:
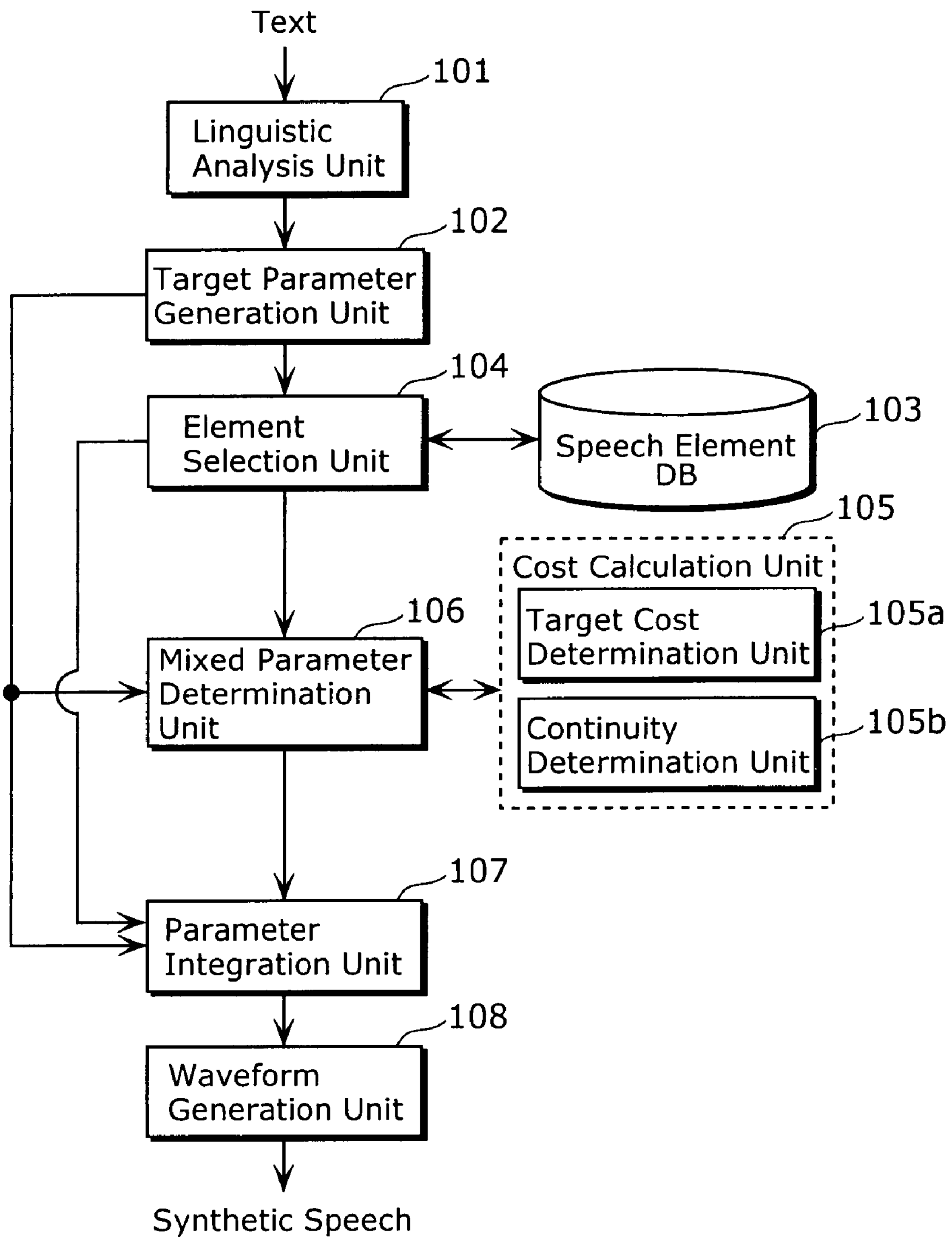
FIG. 4 is a diagram showing a configuration of a speech synthesizer according to the first embodiment of the present invention.

FIG. 4 is a diagram showing a configuration of a speech synthesizer according to the first embodiment of the present invention.

The speech synthesizer of the present embodiment is an apparatus which synthesizes speech that offers both high sound quality and stable sound quality, and includes: a linguistic analysis unit 101, a target parameter generation unit 102, a speech element DB 103, an element selection unit 104, a cost calculation unit 105, a mixed parameter judgment unit 106, a parameter integration unit 107, and a waveform generation unit 108. The cost calculation unit 105 includes a target cost judgment unit 105*a* and a continuity judgment unit 105*b*.

The language analysis unit 101 analyzes the inputted text and outputs phonetic symbols and accent information. For example, in the case where text "今日の天気は" ("today's weather") is inputted, phonetic symbols and accent information "kyo'-no/te'Nkiwa" is outputted. Here, ' indicates an accent position, and/indicates an accent phrase boundary.

The target parameter generation unit 102 generates a parameter group necessary for synthesizing speech based on the phonetic symbols and accent information outputted by linguistic analysis unit 101. Generating the parameter group is not limited to one method in particular. For example, it is possible to generate parameters of stable sound quality using a hidden Markov model (HMM) as shown in Patent Reference 2.

To be specific, the method denoted in Patent Reference 2 may be used. However, note that the method for generating the parameters is not limited thereto.

Figure 5:
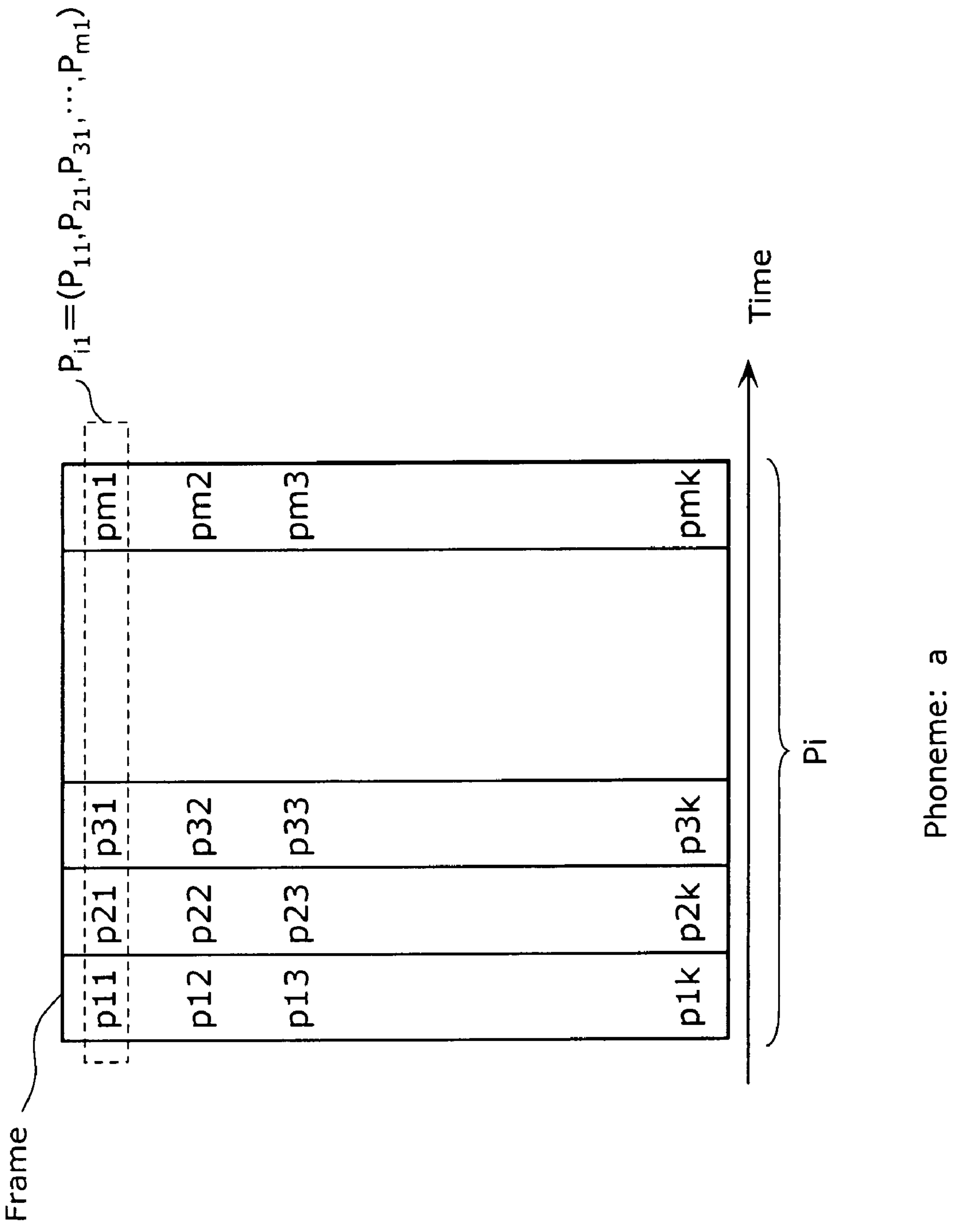
FIG. 5 is a diagram illustrating a speech element.

The speech element DB 103 is a database which analyzes speech (natural speech) recorded in advance and stores the speech as a re-synthesizable parameter group. The unit in which the speech is stored is referred to as a "element." The element unit is not particularly limited; phonemes, syllables, mora, accent phrases, or the like may be used. The present embodiment shall be described using a phoneme as an element unit. In addition, the types of parameters are not particularly limited; for example, sound source information, such as power, duration time length, and fundamental frequency, and vocal tract information such as a cepstrum may be parameterized and stored. One speech element is expressed by k-dimensional parameters of plural frames, as shown in FIG. 5. In FIG. 5, element Pi is configured of m frames, and each frame is composed of k parameters. It is possible to re-synthesize speech through parameters configured in this manner. For example, in the diagram, the area labeled as $P_{i1}=(p_{11}, p_{21}, p_{31}, \ldots P_{m1})$ indicate a temporal change of the first parameter in an element $P_i$ over m frames.

The element selection unit 104 is a selection unit that selects a speech element series from the speech element DB 103 based on the target parameters generated by the target parameter generation unit 102.

The target cost judgment unit 105*a* calculates, per element, a cost based on a degree to which the target parameters generated by the target parameter generation unit 102 and the speech element selected by the element selection unit 104 resemble one another.

The continuity judgment unit 105*b* replaces some speech element parameters selected by the element selection unit 104 with target parameters generated by the target parameter generation unit 102. Then, the continuity judgment unit 105*b* calculates the distortion occurring when speech elements are concatenated, or in other words, calculates the continuity of the parameters.

The mixed parameter judgment unit 106 determines, per element, a selection vector which indicates whether to utilize, as parameters for use in speech synthesis, the parameters selected from the speech element DB 103 or the parameters generated by the target parameter generation unit 102, based on a cost value calculated by the target cost judgment unit

105$a$ and the continuity judgment unit 105$b$. Operations of the mixed parameter judgment unit 106 shall be described later in detail.

The parameter integration unit 107 integrates the parameters selected from the speech element DB 103 and the parameters generated by the target parameter generation unit 102 based on the selection vector determined by the mixed parameter judgment unit 106.

The waveform generation unit 108 synthesizes a synthetic sound based on the synthesis parameters generated by the parameter integration unit 107.

Operations of the speech synthesizer configured in the above mentioned manner shall be described hereafter.

Figure 6:
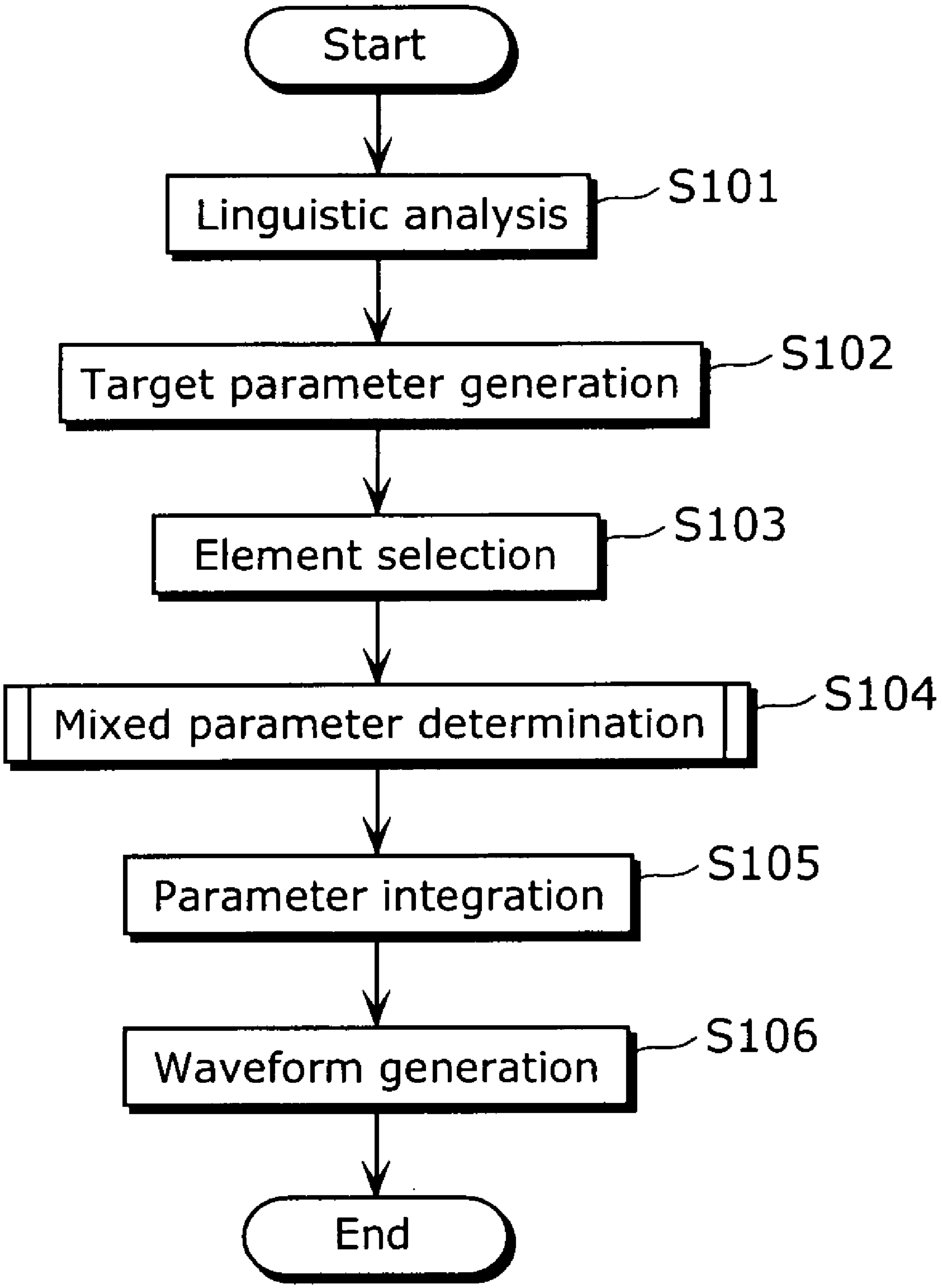
FIG. 6 is a flowchart according to the first embodiment of the present invention.

FIG. 6 is a flowchart showing an operational flow of the speech synthesizer. The language analysis unit 101 linguistically analyzes the inputted text, and generates phonetic symbols and accent information (Step S101). The target parameter generation unit 102 generates a re-synthesizable parameter series $T=t_1, t_2, \ldots, t_n$ (n being the number of elements) through the above mentioned HMM speech synthesis method, based on the phonetic symbols and accent symbols and (Step S102). Hereafter, this parameter series generated by the target parameter generation unit 102 shall be referred to as target parameters.

The element selection unit 104 selects the speech element series $U=u_1, u_2, \ldots, u_n$, which is closest to the target parameters, from the speech element DB 103, based on the generated target parameters (Step S103). Hereafter, the selected speech element series shall be referred to as real speech parameters. The selection method is not particularly limited; for example, selection may be performed through the method denoted in Patent Reference 1.

With the target parameters and real speech parameters as an input, the mixed parameter judgment unit 106 determines a selection vector series C indicating which parameter to use per dimension of the parameter (Step S104). As shown in Formula 1, the selection vector series C is made up of a selection vector $C_i$ for each element. The selection vector $C_i$ indicates, through a binary value, whether to use the target parameters or the real speech parameters per parameter dimension, for an ith element. For example, in the case where $c_{ij}$ is 0, the target parameters are used for a jth parameter of the ith element. However, the case where $c_{ij}$ is 1 indicates that the real speech parameters selected from the speech element DB 103 are used for the jth parameter of the ith element.

Figure 7:
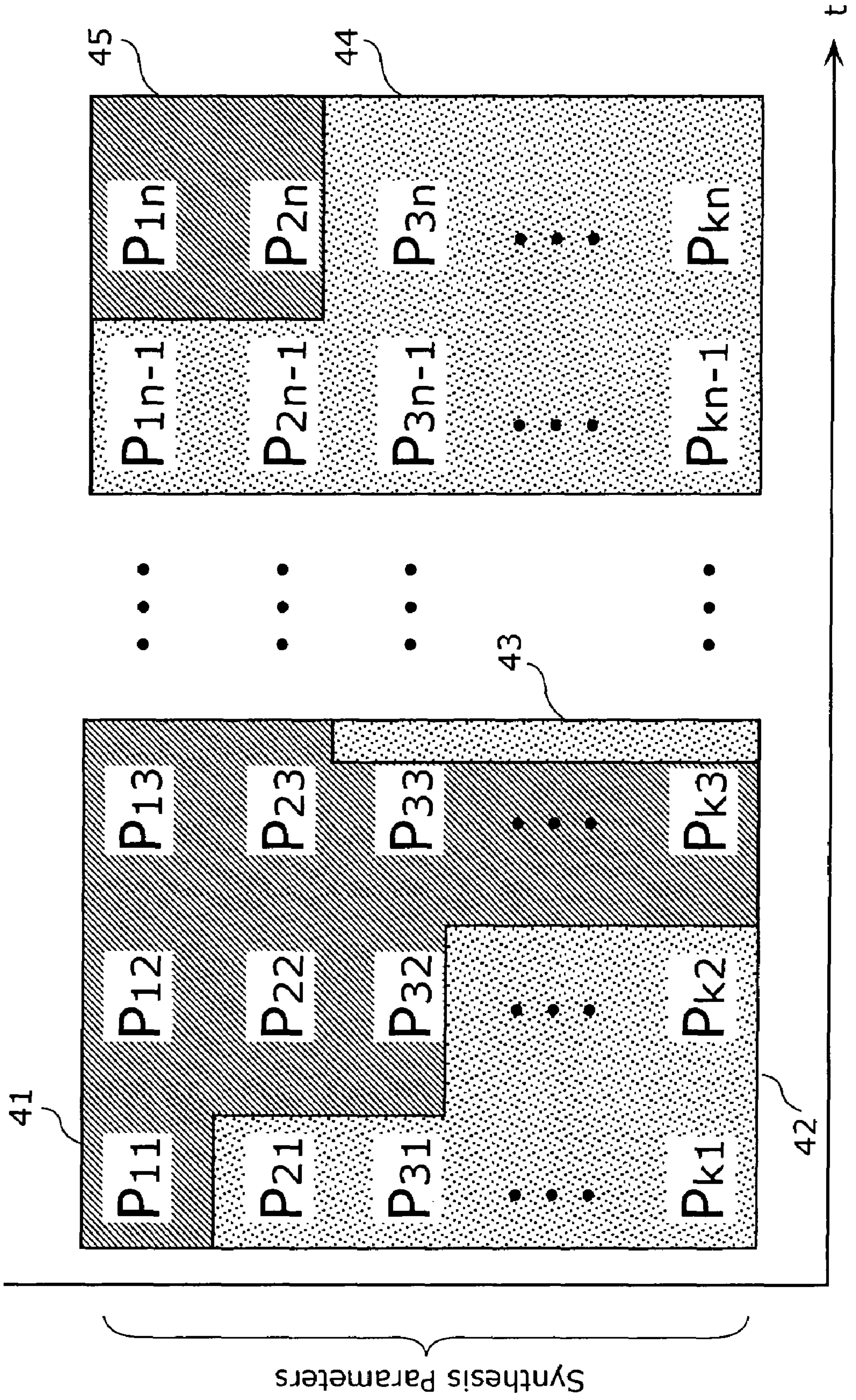
FIG. 7 is a diagram illustrating a parameter mixing result.

FIG. 7 shows an example in which the target parameters and the real speech parameters have been split up by the selection vector series C. FIG. 7 shows areas 42, 43, and 44, which use real speech parameters, and areas 41 and 45, which use target parameters. For example, looking at the first element $P_{K11}$ to $P_{k1}$, target parameters are used for the first parameters, and real speech parameters are used for the second to kth parameters.

By optimally determining this selection vector series C, it is possible to generate synthetic speech with stable and high sound quality, which obtains stable speech quality from the target parameters and a high sound quality with a sense of true speech from the real speech parameters.

[Equation 1]

$$C = C_1, C_2, \ldots, C_n \quad \text{(Formula 1)}$$

However, $$Ci = c_{i1}, c_{i2}, \ldots, c_{ik}$$

$$c_{ij} = \begin{cases} 0 \text{ when using target parameters} \\ 1 \text{ when using real speech parameters} \end{cases}$$

Next, the method for determining the selection vector series C (Step 104 of FIG. 6) shall be described. In order to generate synthetic speech with stable and high sound quality, the mixed parameter judgment unit 106 uses real speech parameters in the case where the real speech parameters resemble the target parameters, and uses target parameters in the case where the real speech parameters do not resemble the target parameters. At this time, in addition to the degree of resemblance of the target parameters, the continuity of the previous and next elements is also considered. Accordingly, it is possible to reduce in continuity arising from parameter replacement. A selection vector series C satisfying this condition is searched using a Viterbi algorithm.

Figure 8:
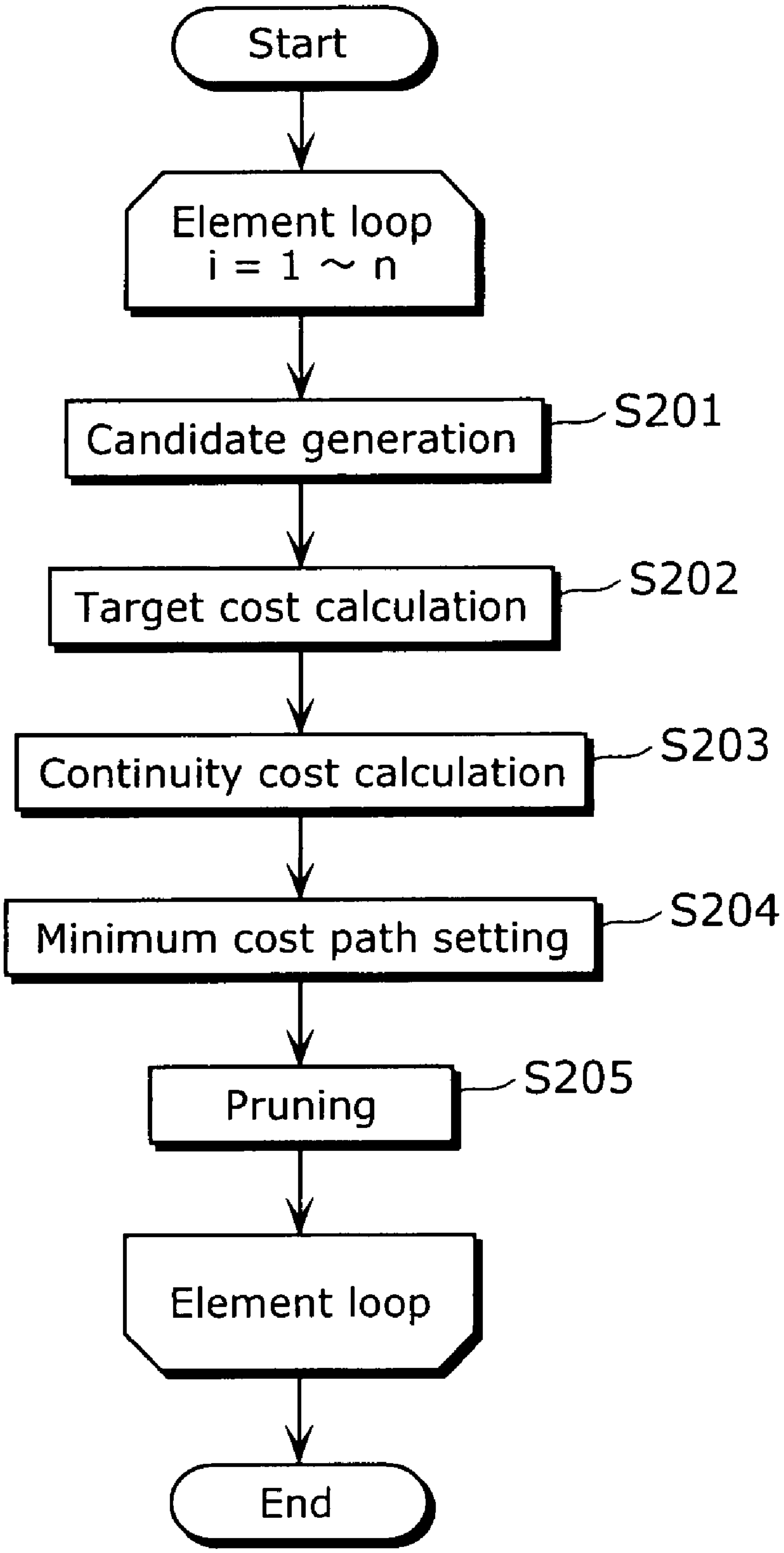
FIG. 8 is a flowchart of a mixed parameter judgment unit.
Figure 9:
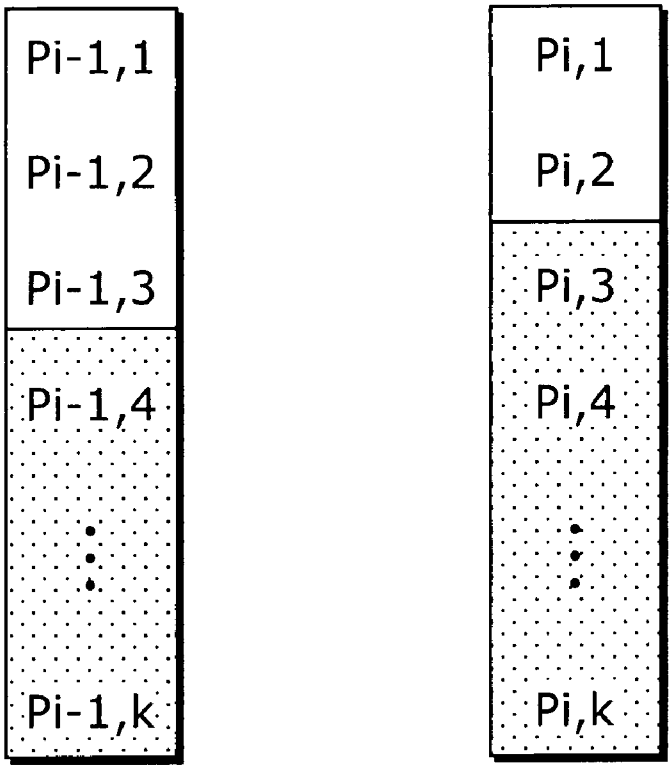
FIG. 9 is a diagram illustrating generation of combination vector candidates.

The search algorithm shall be described with reference to the flowchart shown in FIG. 8. The processing from Step S201 to Step S205 is repeatedly performed in order on elements $i=1, \ldots, n$.

The mixed parameter judgment unit 106 generates p candidates $h_{i,1}, h_{i,2}, \ldots, h_{i,p}$, as selection vector Ci candidates hi, for corresponding elements (Step S201). The method of generation is not particularly limited. As an example of a generation method, all combinations of parameters of each of k dimensions may be generated. In addition, in order to more efficiently generate candidates, it is acceptable to generate only combinations in which a difference from the previous selection vector, selection vector $C_{i-1}$, is less than or equal to a predetermined value. In addition, regarding the first element (i=1), a candidate that, for example, uses all target parameters may be generated ($C_1=(0, 0, \ldots, 0)$), or, conversely, a candidate that uses all real speech parameters may be generated ($C_1=(1, 1, \ldots, 1)$)

The target cost judgment unit 105$a$ calculates, through formula 2, a cost based on a degree to which target parameters ti generated by the target parameter generation unit 102 resemble a speech element ui selected by the element selection unit 104, for each of p selection vector candidates $h_{i,1}, h_{i,2}, \ldots, h_{i,p}$ (Step S202).

[Equation 2]

$$\text{TargetCost}(h_{i,j})=\omega_1\times Tc(h_{i,j}\cdot u_i, h_{i,j}\cdot t_i)+\omega_2\times Tc((1-h_{i,j})\cdot u_i, (1-h_{i,j})\cdot t_i) \text{ However, } j=1\sim p \quad \text{(Formula 2)}$$

Here, $\omega_1$ and $\omega_2$ are weights, and $\omega_1>\omega_2$. The method for determining the weights is not particularly limited, and it is possible to determine the weights based on experience. In addition, $h_{i,j}\cdot u_i$ is a dot product of vectors $h_{i,j}$ and $u_i$, and indicates a parameter subset of real speech parameters $u_i$ utilized by a selection vector candidate $h_{i,j}$. On the other hand, $(1-h_{i,j})\cdot u_i$ indicates a parameter subset of real speech parameters $u_i$ not utilized by a selection vector candidate $h_{i,j}$. The same applies to the target parameters $t_i$. A function Tc calculates the cost value based on the resemblance between parameters. The calculation method is not particularly limited; for example, calculation may be performed through a weighted summation of the difference between each parameter dimension. For example, the function Tc is set so that the cost value decreases as the degree of resemblance increases.

When this is repeated, the value of the first instance of the function Tc in formula 2 shows the cost value based on the degree of resemblance between the parameter subset of real speech parameters $u_i$ utilized by the selection candidate vector $h_{i,j}$ and a parameter subset of the target parameters $t_i$. The value of the second instance of the function Tc in formula 2 shows the cost value based on the degree of resemblance between the parameter subset of real speech parameters $u_i$ not utilized by the selection candidate vector $h_{i,j}$ and a parameter subset of the target parameters $t_i$. Formula 2 shows a weighted sum of these two cost values.

The continuity judgment unit 105_b_ evaluates, using formula 3, a cost based on the continuity with the selection vector candidate, for each selection vector candidate $h_{i,j}$ (step S203).

[Equation 3]

$$\mathrm{ContCost}(h_{i,j},h_{i-1,r})=Cc(h_{i,j}\cdot u_i+(1-h_{i,j})\cdot t_i,h_{i-1,r}\cdot u_{i-1}+(1-h_{i-1,r})\cdot t_{i-1}) \quad \text{(Formula 3)}$$

Here, $h_{i,j}\cdot u_i+(1-h_{i,j})\cdot u_i$ is a parameter that forms an element i, which is composed of a combination of a target parameter subset specified by the selection vector candidate $h_{i,j}$ and the real speech parameter subset; $h_{i-1,r}\cdot u_{i-1}+(1-h_{i-1,r})\cdot u_{i-1}$ is a parameter that forms an element i−1, which is specified by a selection vector candidate $h_{i-1,r}$ relating to the previous element i−1.

A function Cc is function that evaluates a cost based on the continuity of two element parameters. In other words, in this function, when the continuity of two element parameters is good, the value decreases. A method for this calculation is not particularly limited; for example, the calculation may be performed through a weighted sum of differential values of each parameter dimension between the last frame of the element i−1 and the first frame of the element i.

Figure 10:
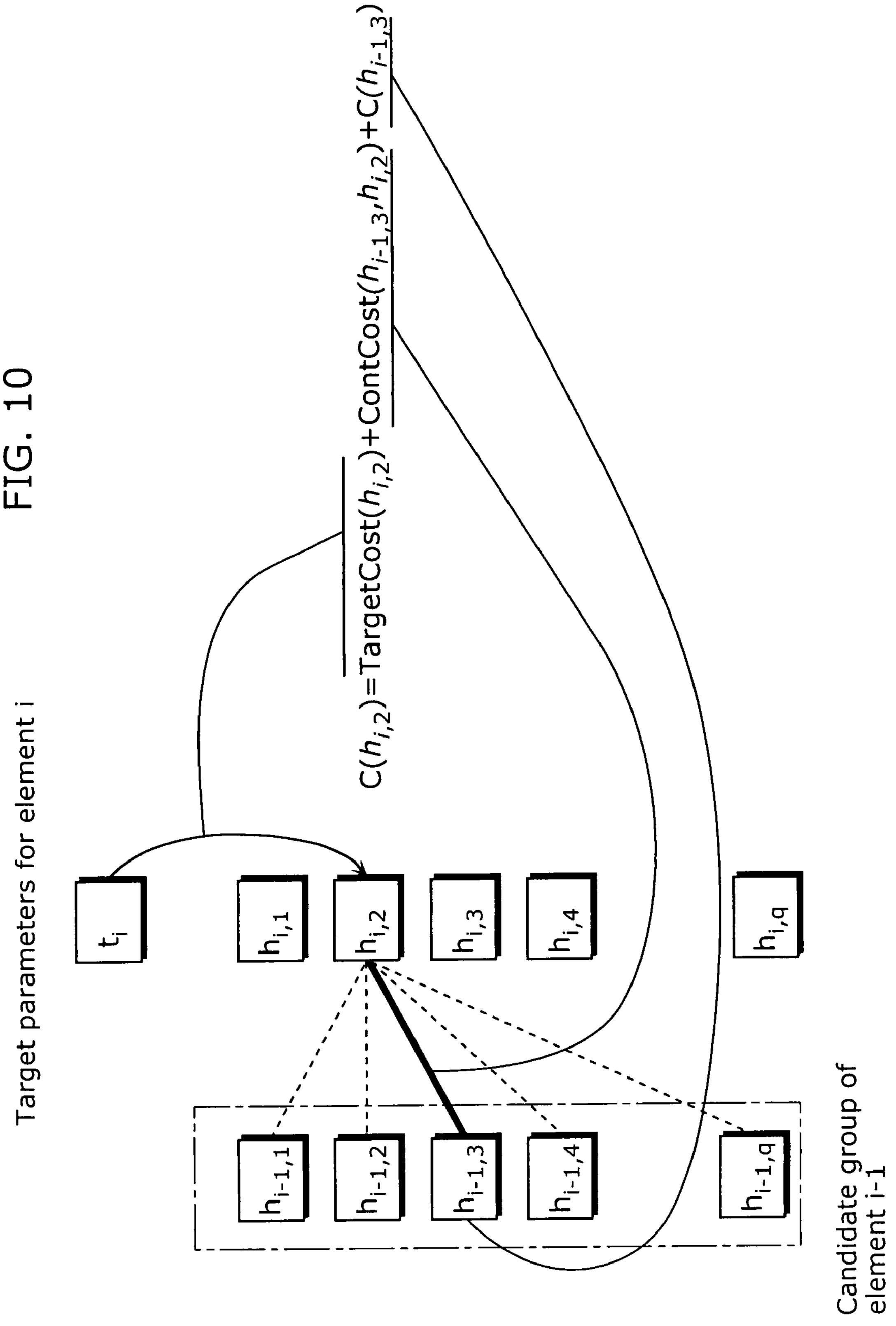
FIG. 10 is a diagram illustrating a Viterbi algorithm.

As shown in FIG. 10, the mixed parameter judgment unit 106 calculates a cost (C ($h_{i,j}$)) for the selection vector candidate $h_{i,j}$ based on formula 4, and at the same time, determines a concatenation root (B($h_{i,j}$)) that indicates which selection vector candidate, from among the selection vector candidates $h_{i-1,r}$, the element i−1 should be concatenated to (Step S204). Note that in FIG. 10, $h_{i-1,3}$ is selected as the concatenation root.

[Equation 4]

$$C(h_{i,j}) = TargetCost(h_{i,j}) + \mathop{\mathrm{Min}}_{p}[ContCost(h_{i,j}, h_{i-1,p}) + C(h_{i-1,p})] \quad \text{(Formula 4)}$$

However,

[Equation 5]

$$\mathop{\mathrm{Min}}_{n}[]$$

shows a value in which the value in the brackets drops to a minimum when p is changed, and

[Equation 6]

$$\mathop{\mathrm{argmin}}_{p}[]$$

shows the value of p when the value in the brackets drops to a minimum when p is changed.

In order to reduce the space of the search, the mixed parameter judgment unit 106 reduces the selection vector candidate $h_{i,j}$ for the element i based on the cost value (C ($h_{i,j}$)) (Step S205). For example, selection vector candidates having a cost value greater than the minimum cost value by a predetermined threshold amount may be eliminated through a beam search. Or, it is acceptable to retain only a predetermined number of candidates from among candidates with low costs.

Note that the pruning processing of Step S205 is processing for reducing the computational amount; when there is no problem with the computational amount, this processing may be omitted.

The processing from the above-mentioned Step S201 to Step S205 is repeated for the element i(i=1, . . . , n). The mixed parameter judgment unit 106 selects the selection candidate with the minimum cost at the time of the last element i=n,

[Equation 7]

$$s_n = \mathop{\mathrm{argmin}}_{j} C(h_{n,j})$$

and sequentially backtracks using the information of the concatenation root,

[Equation 8]

$$s_{n-1}=B(h_{n,s_n})$$

and thus it is possible to find the selection vector series C using formula 5.

[Equation 9]

$$C=C_1,C_2, \ldots ,C_n=h_{1,s_1},h_{2,s_2}, \ldots ,h_{n,s_n} \quad \text{(Formula 5)}$$

By using the selection vector series C thus obtained, it is possible to utilize the real speech parameters in the case where the real speech parameters resemble the target parameters, and the target parameters in other cases.

Using the target parameter series $T=t_1, t_2 \ldots, t_n$ obtained in Step S102, the real speech parameter series $U=u_1, u_2, \ldots, u_n$ obtained in Step S103, and the selection vector series $C=C_1, C_2 \ldots, C_n$ obtained in Step S104, the parameter integration unit 107 generates a synthesized parameter series $P=p_1, p_2, \ldots, p_n$, using formula 6 (Step S105).

[Equation 10]

$$p_i=C_i\cdot u_i+(1-C_i)\cdot t_i \quad \text{(Formula 6)}$$

The waveform generation unit 108 synthesizes synthetic speech using the synthesized parameter series $P=p_1, p_2, \ldots, p_n$, generated in Step S105 (Step S106). The method of synthesis is not particularly limited. A synthesis method determined by the parameters generated by the target parameter generation unit generates may be used; for example, the synthetic speech may be synthesized using the excitation source generation and synthesis filter of Patent Reference 2.

According to the speech synthesizer configured as described above, it is possible to utilize the real speech parameters in the case where the real speech parameters resemble the target parameters, and the target parameters in other cases, by using the target parameter generation unit which generates target parameters, the element selection unit which selects real speech parameters based on the target parameters, and the mixed parameter judgment unit which generates the selection vector series C, which switches the target parameters and the real speech parameters, based on the degree to which the target parameters resemble the real speech parameters.

According to this configuration, the format of the parameters generated by the target parameter generation unit is identical to the format of the elements stored in the speech element DB 103. Therefore, as shown in FIG. 7, it is possible to prevent local degradation of sound quality caused by the use of real speech parameters by selecting speech elements that partially resemble the target parameters and using the target parameters themselves for the speech element parameters that do not resemble the target parameters, even in the case where the degree of resemblance to the target parameters is low (that is, the case where speech elements that resemble the target parameters are not stored in the speech element DB 103).

In addition, with the conventional speech synthesis system based on statistical models, there is a drop in the sense of true speech because parameters generated based on the statistical model are used even when elements resembling the target parameters are present; however, by using real speech parameters (that is, selecting speech elements resembling the target parameters and using the speech element parameters themselves for the speech element parameters which resemble the target parameters), the sense of true speech does not decrease, and it is possible to obtain synthesized speech with a high sense of true speech and high sound quality. Therefore, it is possible to generate synthetic speech which has both stable speech quality obtained from the target parameters and a high sound quality with a sense of true speech obtained from the real speech parameters.

Figure 11:
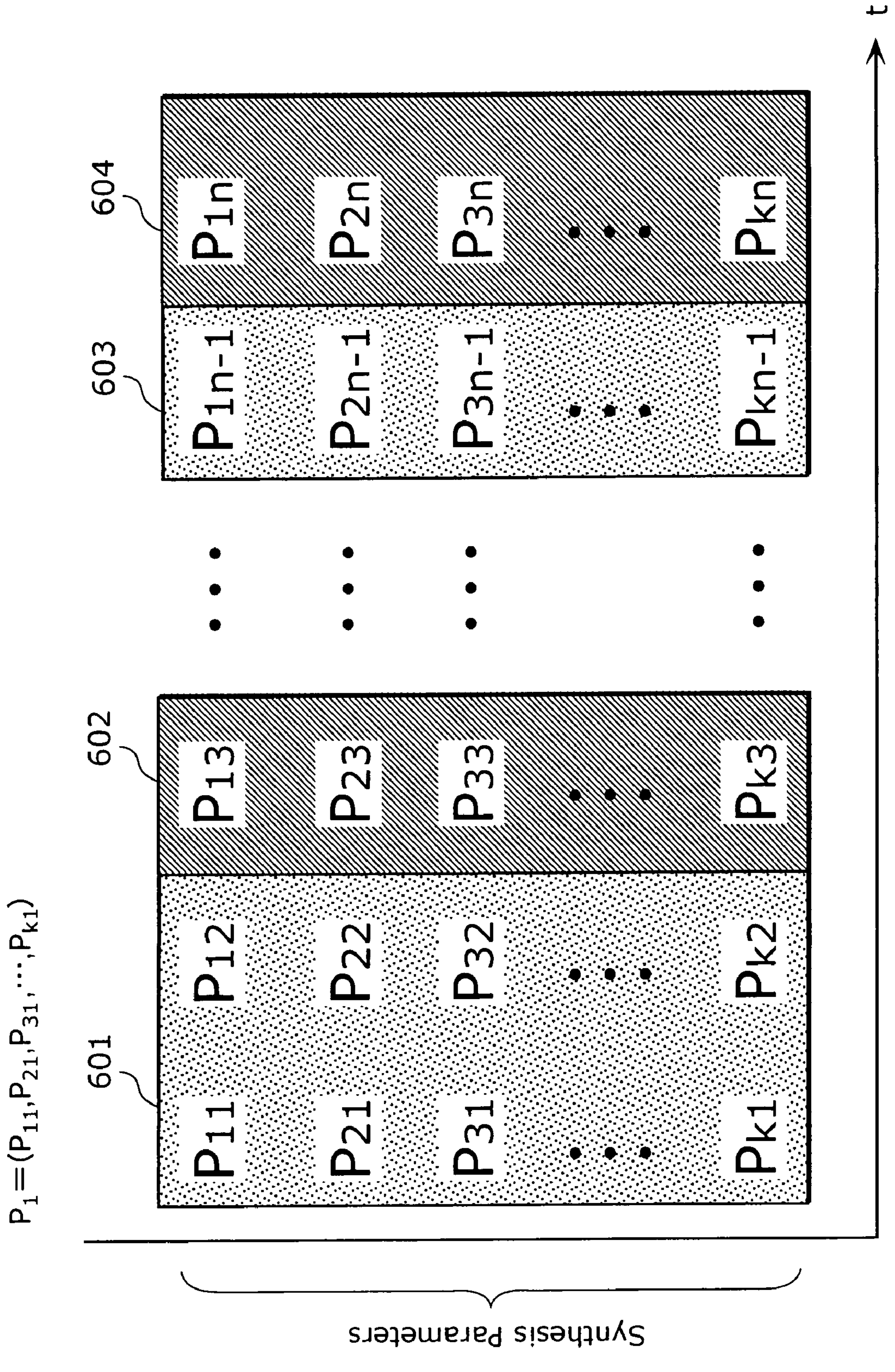
FIG. 11 is a diagram showing a parameter mixing result when a mixing vector is a scalar value.

Note that in the present embodiment, the selection vector $C_i$ is set for each dimension of parameters; however, the configuration may be such that whether to utilize the target parameters or the real speech parameters for the element is selected by setting the same value in all dimensions, as shown in FIG. 11. In FIG. 11, areas 601 and 603 of elements that use real speech parameters and areas 602 and 604 of elements that use target parameters are shown as an example.

The present invention is extremely effective in the case of generating not only synthetic speech that has a single voice quality (for example, a read-aloud tone), but also synthetic speech that has plural voice qualities, such as "anger," "joy," and so on.

The reason for this is that there is a tremendous cost in preparing a sufficient quantity of speech data for the respective various voice qualities, and hence such preparation is difficult.

Figure 12:
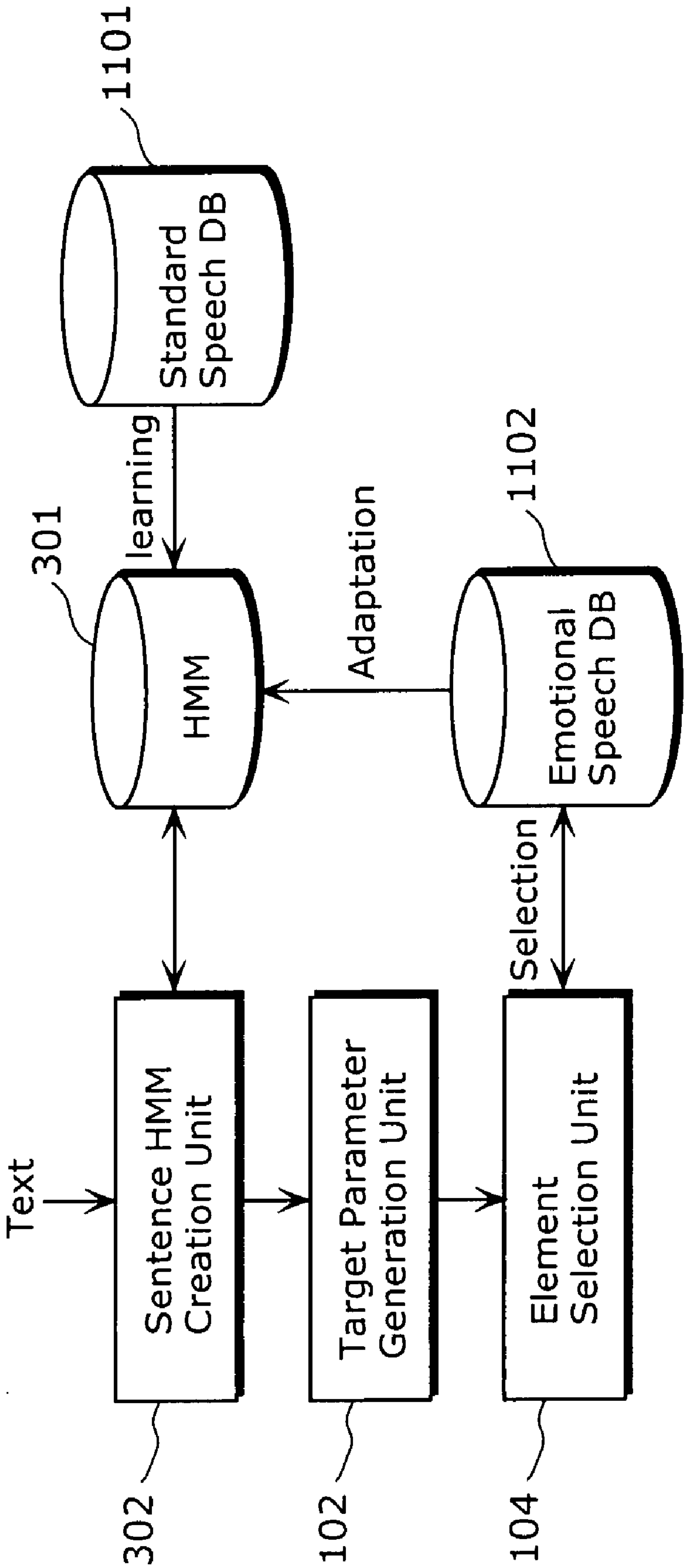
FIG. 12 is a diagram showing a situation in which voice quality conversion is performed.

The above descriptions are not particularly limited to HMM models and speech elements; however, it is possible to generate synthetic speech with multiple voice qualities by configuring the HMM model and speech elements in the following manner. In other words, as shown in FIG. 12, a sentence HMM creation unit 302 for generating target parameters is prepared in addition to the target parameter generation unit 102, and a normal read-aloud speech DB 1101 is created with the HMM model 301 referred to by the sentence HMM creation unit 302 used as a standard speech DB. Furthermore, the sentence HMM creation unit 302 adapts the emotions such as "anger" and "joy" stored in the emotional speech DB 1102 with the HMM model 301. Note that the sentence HMM creation unit 302 corresponds to a statistical model creation device which creates a statistical model of speech that has special emotions.

Accordingly, the target parameter generation unit 102 can generate target parameters that have emotions. The method of adaptation is not particularly limited; for example, it is possible to adapt the method denoted in the following document: Tachibana et al, "Performance evaluation of style adaptation for hidden semi-Markov model based speech synthesis," Technical Report of IEICE SP2003-08 (August, 2003). Meanwhile, the emotional speech DB 1102 is used as the speech element DB selected by the element selection unit 104.

Through such a configuration, it is possible to generate synthesis parameters for a specified emotion with stable sound quality by using the HMM 301 to which the emotional speech DB 1102 has been adapted; in addition, emotional speech elements are selected from the emotional speech DB 1102 by the element selection unit 104. The mixed parameter judgment unit 106 determines the mix of parameters generated by the HMM and parameters selected from the emotional speech DB 1102, which are integrated by the parameter integration unit 107.

Unless a sufficient speech element database is prepared, it is difficult for a conventional waveform superposition-type speech synthesizer that expresses emotions to generate high-quality synthesized speech. In addition, while model adaptation is possible with conventional HMM speech synthesis, it is a statistical process, and thus there is a problem in that corruption (loss of a sense of true speech) occurs in the synthetic speech. However, as mentioned above, by configuring the emotional speech DB 1102 as adaptation data of an HMM model and a speech element DB, it is possible to generate synthetic speech which has both stable sound quality obtained through target parameters generated by the adapted model and high-quality sound with a sense of true speech obtained through the real speech parameters selected from the emotional speech database 1102. In other words, in the case where real speech parameters resembling the target parameters can be selected, sound quality with a high sense of true speech and which includes natural emotions can be realized by using the real speech parameters, as opposed to using parameters with a low sense of true speech generated by the conventional statistical model. On the other hand, in the case where real speech parameters with low resemblance to the target parameters are selected, is possible to prevent local degradation in sound quality by using the target parameters, as opposed to the conventional waveform concatenation-type speech synthesis system, in which the sound quality drops locally.

Therefore, according to the present invention, even in the case where synthetic speech with plural voice qualities is to be created, it is possible to generate synthetic speech with a sense of true speech higher than that of synthetic speech generated by a statistical model, without recording large amounts of speech having the various voice qualities.

Moreover, it is possible to generate synthetic speech adapted to a specific individual by using the speech DB based on the specific individual in place of the emotional speech DB 1102.

Second Embodiment

Figure 13:
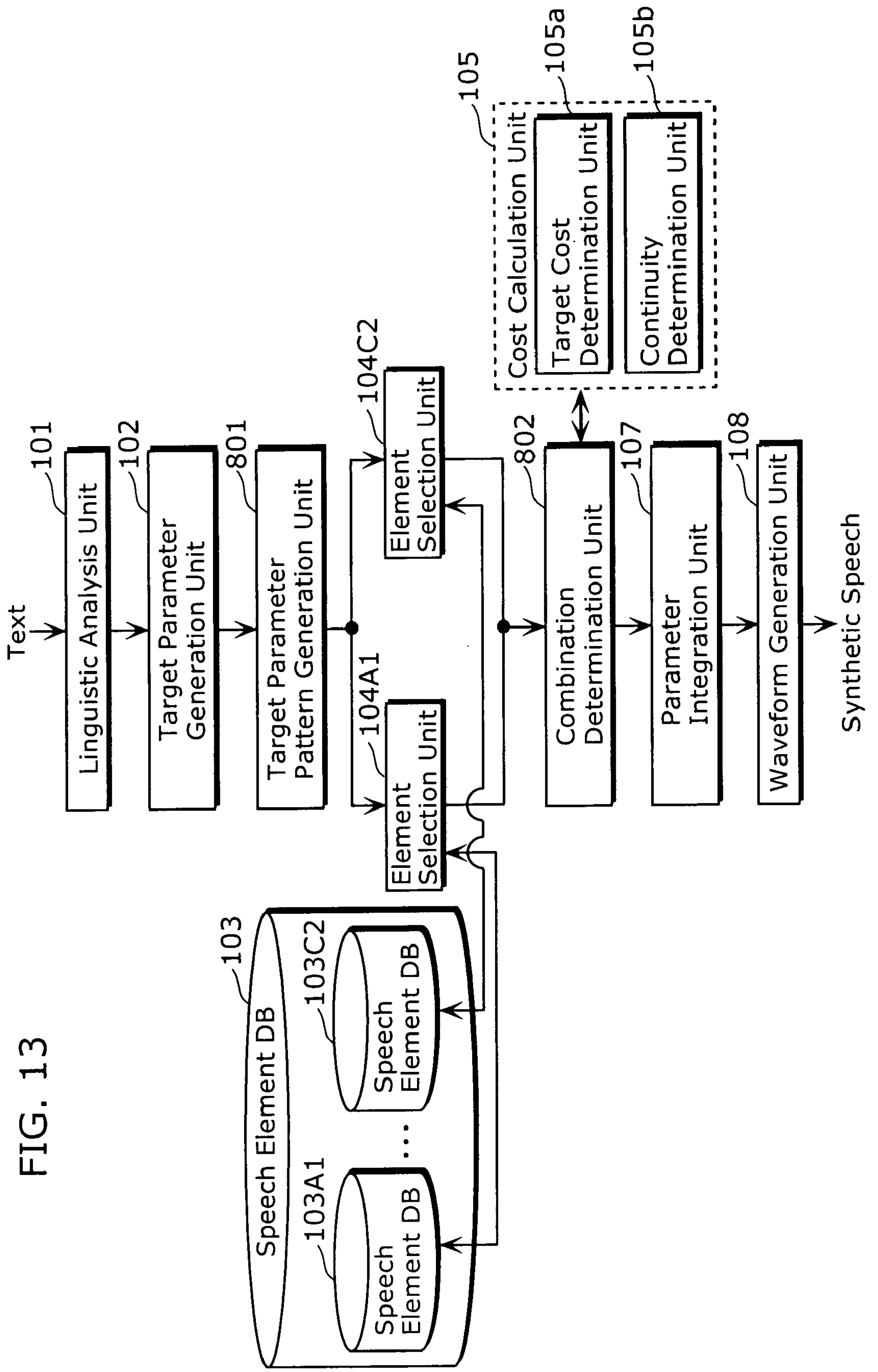
FIG. 13 is a diagram showing a configuration of a speech synthesizer according to the second embodiment of the present invention.

FIG. 13 is a diagram showing a configuration of a speech synthesizer according to the first embodiment of the present invention. In FIG. 13, constituent elements identical to those in FIG. 4 are given the same numbers, and descriptions thereof shall be omitted.

In FIG. 13, a target parameter generation unit 801 is a processing unit that generates a target parameter pattern, described below, based on target parameters generated by the target parameter generation unit 102.

Speech element DBs 103A1 to 103C2 are subsets of the speech element DB 103, and are speech element DBs which store parameters corresponding to each target parameter pattern generated by the target parameter pattern generation unit 801.

Element selection units 104A1 to 104C2 are processing units, each of which selects speech elements most resembling the target parameter pattern generated by the target parameter pattern generation unit 801 from the speech element DBs 103A1 to 103C2.

By configuring the speech synthesizer in the above manner, it is possible to combine subsets of parameters for speech elements selected per parameter pattern. Accordingly, it is possible to generate parameters based on real speech that more closely resembles the target parameters, as compared to the case of selection based on a single element.

Figure 14:
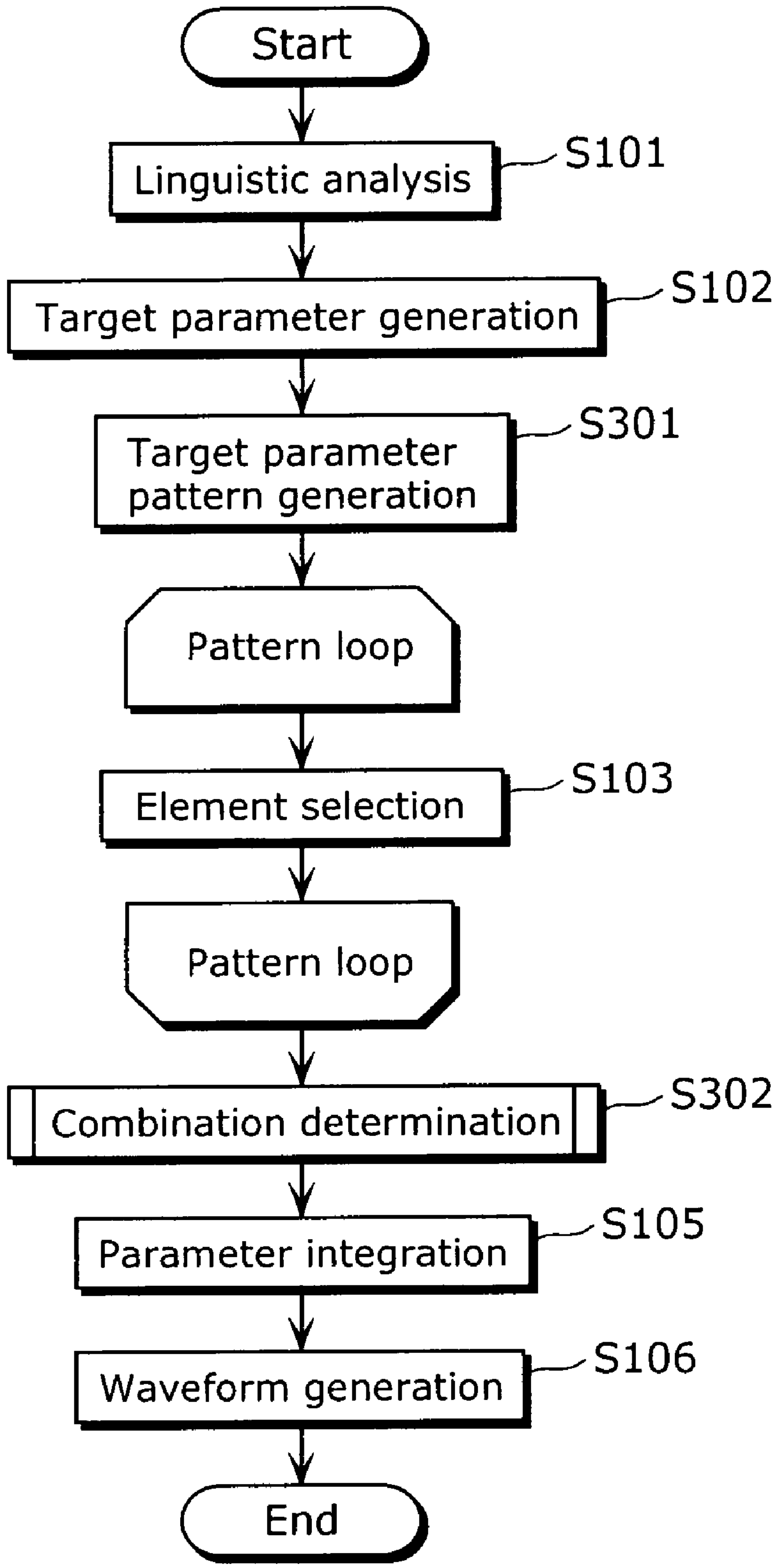
FIG. 14 is a flowchart according to the second embodiment of the present invention.

Hereafter, an operation of the speech synthesizer according to the second embodiment of the present invention shall be described using the flowchart in FIG. 14.

The language analysis unit 101 linguistically analyzes the inputted text, and outputs phonetic symbols and accent information. The target parameter generation unit 102 generates a re-synthesizable parameter series $T=t_1, t_2, \ldots, t_n$ through the above mentioned HMM speech synthesis method, based on the phonetic symbols and accent symbols and (Step S102). This parameter series is called target parameters.

Figure 15:
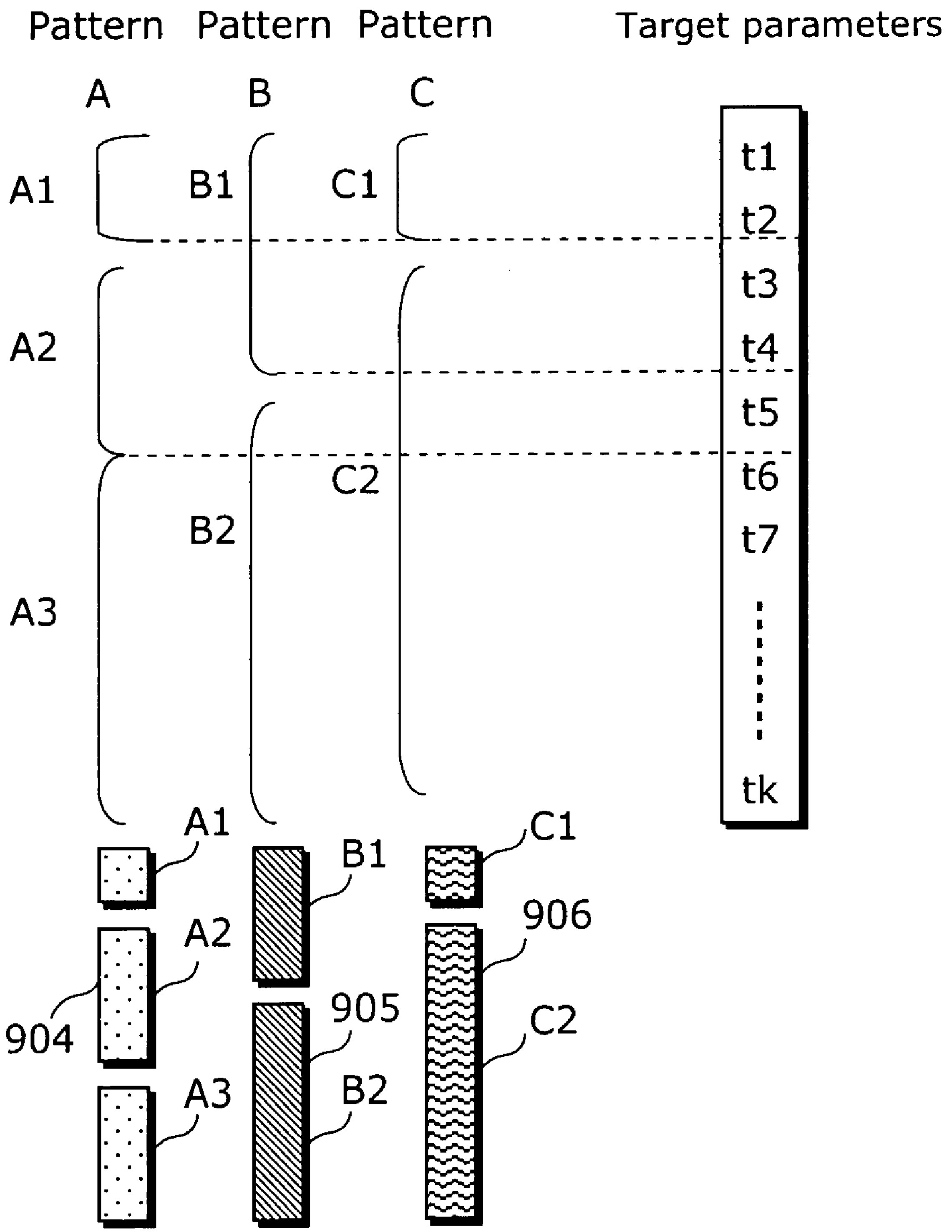
FIG. 15 is a diagram illustrating a target parameter pattern generation unit.

The target parameter generation unit 801 divides the target parameters into subsets of parameters, as shown in FIG. 15 (step S301). The method of division is not particularly limited; for example, the following methods of division are possible The following methods of division are examples, and are not meant to limit the present embodiment in any way.

sound source information and vocal tract information fundamental frequency, spectral information, and fluctuation information fundamental frequency, sound source spectral information, vocal tract spectral information, and sound source fluctuation information Plural parameter patterns divided in such a way are prepared (pattern A, pattern B, and pattern C in FIG. 15). In FIG. 15, pattern A is divided into three subsets: patterns A1, A2, and A3. In the same manner, pattern B is divided into two subsets, or patterns B1 and B2, and pattern C is divided into two subsets, or patterns C1 and C2.

Next, the element selection units 104A1 to 104C2 select elements for each of the plural parameter patterns generated in Step S301 (Step S103).

In step S103, the element selection units 104A1 to 104C2 select, from the speech element DBs 103A1 to 103C2, optimal speech elements per subset of patterns generated by the target parameter pattern generation unit 801 (patterns A1, A2, . . . , C2), and create an element candidate set sequence U. The method for selecting each element candidate $u_i$ may be identical to that described in the above mentioned first embodiment.

[Equation 11]

$$U=U_1, U_2, \ldots, U_n U_i=(u_{i1}, u_{i2}, \ldots, u_{im}) \qquad \text{(Formula 7)}$$

In FIG. 13, plural element selection units and speech element DBs are prepared; however these do not have to be physically prepared, and the apparatus may be designed so that the speech element DB and element selection unit of the first embodiment are used multiple times.

The combination judgment unit 802 determines a combination vector series S of real speech parameters selected by the respective element selection units (A1, A2, . . . , C2) (Step S302). The combination vector series S can be defined with formula 8.

[Equation 12]

$$S = S_1, S_2, \ldots, S_n \qquad \text{(Formula 8)}$$
$$S_1 = (s_1, s_2, \ldots, s_m)$$
$$s_1 = \begin{cases} 0\text{: when not utilizing } ith \text{ subset} \\ 1\text{: when utilizing } ith \text{ subset} \end{cases}$$

Figure 16:
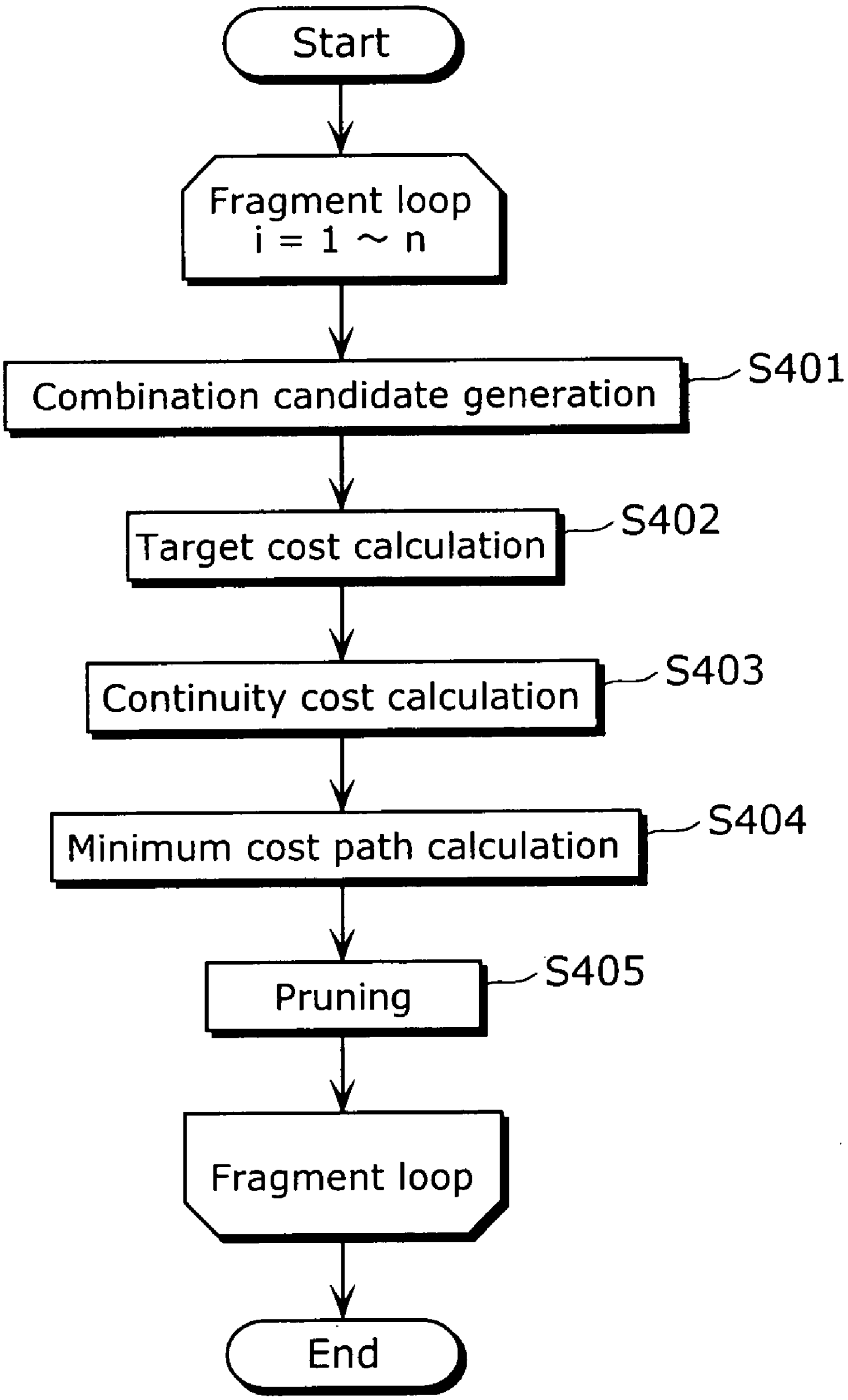
FIG. 16 is a flowchart of a combination vector judgment unit.

The method for determining the combination vectors (Step S302) shall be described in detail using FIG. 16. The search algorithm shall be described with reference to the flowchart shown in FIG. 16. The processing from Step S401 to Step S405 is repeatedly performed in order on elements i(i=1, . . . , n).

Figures 17A, 17B:
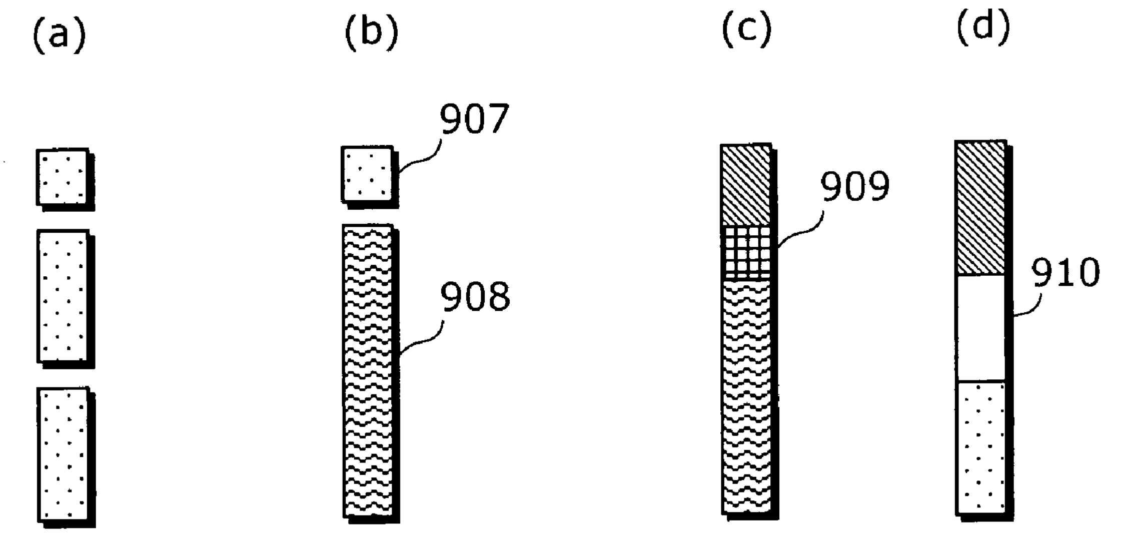
FIG. 17A is a diagram illustrating generation of selection vector candidates.
FIG. 17B is a diagram illustrating generation of selection vector candidates.

The combination judgment unit 802 generates p candidates $h_{i,1}, h_{i,2}, \ldots, h_{i,p}$, as combination vector Si candidates $h_i$, for corresponding elements (Step S401). The method of generation is not particularly limited. For example, only a subset included in a certain single pattern may be generated, as shown in FIG. 17A(a) and 17B(a). In addition, subsets belonging to plural patterns may be generated so that no overlap occurs between parameters (907 and 908), as shown in FIG. 17A(b) and FIG. 17B(b). Or, subsets belonging to plural patterns may be generated so that overlap partially occurs between parameters, as shown in FIG. 17A(c) and FIG. 17B(c). In this case, for parameters for which overlap has occurred, the barycentric point of each parameter is used. Moreover, subsets belonging to plural patterns may be generated so that some parameters miss when combined with one another, as shown by the parameter 910 in FIG. 17A(d) and FIG. 17B(d),. In such a case, target parameters generated by the target parameter generation unit may be used as substitutes for the missed parameters.

The target cost judgment unit 105*a* calculates, through formula 9, a cost based on the degree to which the candidates $h_{i,1}, h_{i,2}, \ldots, h_{i,p}$ for the selection vector $S_i$ resemble the target parameters $t_i$ of the element i (Step S402).

[Equation 13]

$$\text{TargetCost}(h_{i,j})=\omega_1 \times Tc(h_{i,j}\cdot U_i, t_i) \qquad \text{(Formula 9)}$$

Here, $\omega_1$ is weight. A method for determining the weights is not particularly limited, and it is possible to determine the weights based on experience. In addition, $h_{i,j}\cdot U_i$ is a dot product of the vector $h_{i,j}$ and the vector $U_i$, and indicates a subset of each element candidate determined through the combination vector $h_{i,j}$. A function Tc calculates the cost value based on the resemblance between parameters. The calculation method is not particularly limited; for example, calculation may be performed through a weighted summation of the difference between each parameter dimension.

The continuity judgment unit 105*b* evaluates, using formula 10, a cost based on the continuity with the previous selection vector candidate, for each selection vector candidate $h_{i,j}$ (step S403).

[Equation 14]

$$\text{ContCost}(h_{i,j}, h_{i-1,r})=Cc(h_{i,j}\cdot U_{i-1,r}\cdot U_{i-1}) \qquad \text{(Formula 10)}$$

A function Cc is function that evaluates a cost based on the continuity of two element parameters. A method for this calculation is not particularly limited; for example, the calculation may be performed through a weighted sum of differential values of each parameter dimension between the last frame of the element i−1 and the first frame of the element i.

The combination judgment unit 802 calculates a cost (C ($h_{i,j}$)) for the selection vector candidate $h_{i,j}$, and at the same time, determines a concatenation root (B($h_{i,j}$)) that indicates which selection vector candidate, from among the selection vector candidates $h_{i-1,r}$, the element i−1 should be concatenated to (Step S404).

[Equation 15]

$$C(h_{i,j}) = TargetCost(h_{i,j}) + \min_p[ContCost(h_{i,j}, h_{i-1,p}) + C(h_{i-1,p})] \qquad \text{(Formula 11)}$$
$$B(h_{i,j}) = \operatorname*{argmin}_p[ContCost(h_{i,j}, h_{i-1,p}) + C(h_{i-1,p})]$$

In order to reduce the space of the search, the combination judgment unit 802 reduces the selection vector candidate $h_{i,j}$ for the element i based on the cost value (C ($h_{i,j}$)) (Step S405). For example, selection vector candidates having a cost value greater than the minimum cost value by a predetermined threshold amount may be eliminated through a beam search. Or, it is acceptable to retain only a predetermined number of candidates from among candidates with low costs.

Note that the pruning processing of Step S405 is a step for reducing the computational amount; when there is no problem with the computational amount, this processing may be omitted.

The processing from the above-mentioned Step S401 to Step S405 is repeated for the element i(i=1, . . . , n). The combination judgment unit 802 selects the selection candidate with the minimum cost at the time of the last element i=n.

[Equation 16]

$$s_n = \underset{j}{\operatorname{argmin}} C(h_{n,j})$$

Thereafter, the combination judgment unit 802 sequentially backtracks using the information of the concatenation root,

[Equation 17]

$$s_{n-1}=B(h_{n,s_n})$$

and it is possible to find the combination vector series S through formula 12.

[Equation 18]

$$S=S_1,S_2, \ldots ,S_n=h_{1,s_1},h_{2,s_2}, \ldots ,h_{n,s_n} \quad \text{(Formula 12)}$$

Figure 18:
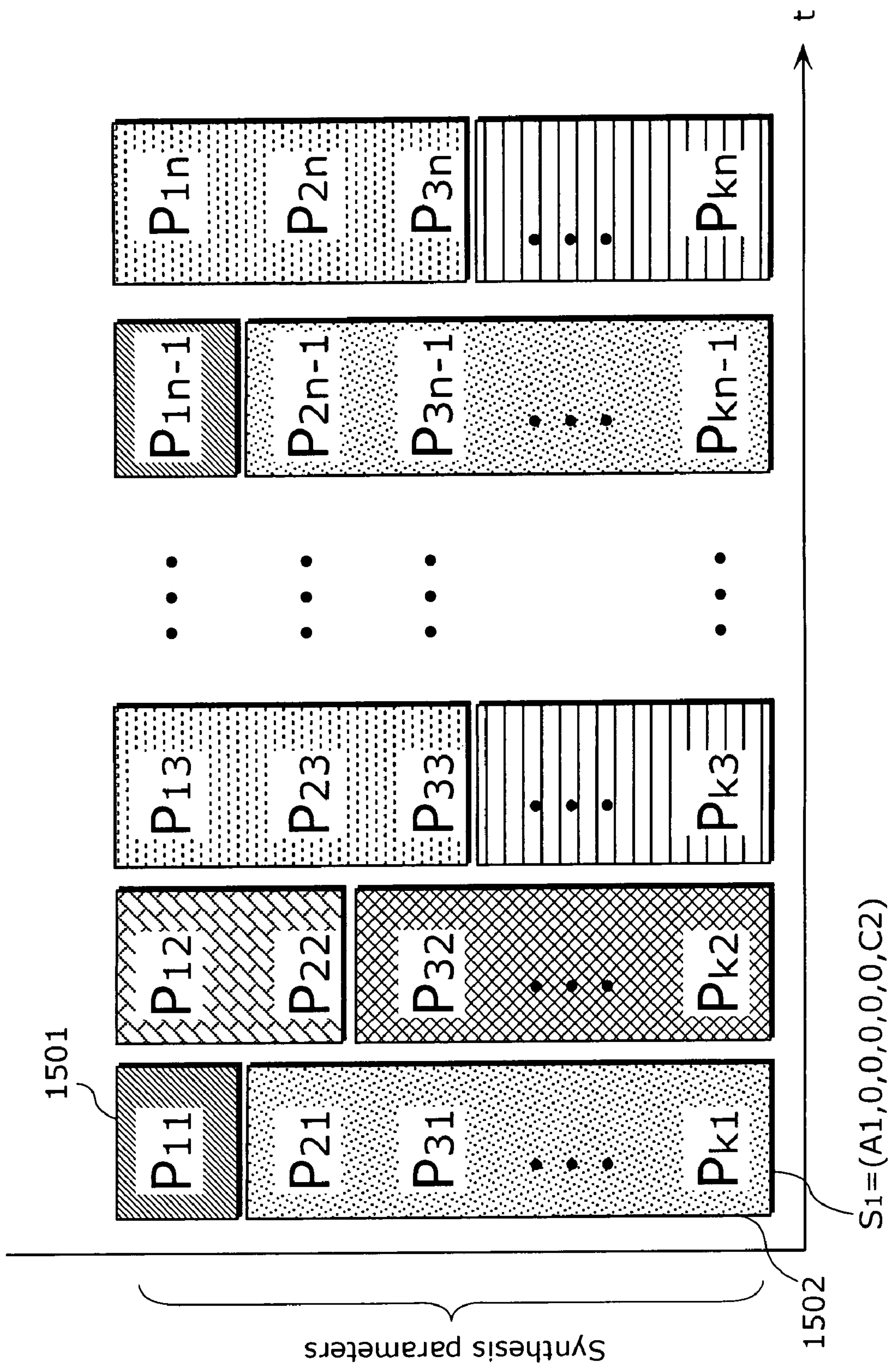
FIG. 18 is a diagram illustrating a combination result.

Based on the combination vector determined by the combination judgment unit 802, the parameter integration unit 107 integrates the parameters of the elements selected by each element selection unit (A1, A2, . . . , C2), using formula 13 (Step S105). FIG. 18 is a diagram showing an example of the integration. In this example, the combination vector $S_1$ of element 1 is ($A_1$, 0, 0, 0, 0, 0, $C_2$) and a combination of A1 from pattern A and C2 from pattern C is selected. Accordingly, an element 1501 selected through the pattern A1 is combined with an element 1502 selected through the pattern C2, and this combination is the parameters of the element 1. It is possible to obtain the parameter series by repeating $S_2$, . . . , up to $S_n$ thereafter.

[Equation 19]

$$p_i=S_i \cdot U_i \quad \text{(Formula 13)}$$

The waveform generation unit 108 synthesizes a synthetic sound based on the synthesis parameters generated by the parameter integration unit 107 (Step S106). The method of synthesis is not particularly limited.

According to speech synthesizer configured as above, a parameter series resembling the target parameters generated by the target parameter generation unit is combined with real speech parameters that are a subset of plural real speech elements. Accordingly, as shown in FIG. 18, it is possible to synthesize real speech parameters which resemble the target parameters by combining real speech parameters of plural real speech elements selected from each of plural parameter sets in the case where the resemblance to target parameters is low, as opposed to the conventional waveform concatenation-type speech synthesis system, in which the sound quality drops locally in the case where real speech parameters which bear little resemblance to target parameters are selected. Through this, it is possible to stably select elements that resemble the target parameters; furthermore, high-quality sound is achieved because real speech elements are used. In other words, it is possible to generate synthetic sound in which both high sound quality and stability are present.

In particular, it is possible to obtain synthetic sound in which both high sound quality and stability are present even in the case where the element DB is not sufficiently large. In other words, in the present embodiment, when of generating not only synthetic speech that has a single voice quality (for example, a read-aloud tone), but also synthetic speech that has plural voice qualities, such as "anger," "joy," and so on, as shown in FIG. 12, a sentence HMM creation unit 302 for generating target parameters is prepared in addition to the target parameter generation unit 102, and a normal read-aloud speech DB 1101 is created with the HMM model referred to by the sentence HMM creation unit 302 used as a standard speech DB, as shown in FIG. 12. Furthermore, the HMM model 301 is adapted through the emotions such as "anger" and "joy" stored in the emotional speech DB 1102. The method of adaptation is not particularly limited; for example, it is possible to apply the method denoted in the following document: Tachibana et al, "Performance evaluation of style adaptation for hidden semi-Markov model based speech synthesis," Technical Report of IEICE SP2003-08 (August, 2003). Meanwhile, the emotional speech DB 1102 is used as the speech element DB selected by the element selection unit 104.

Through such a configuration, it is possible to generate synthesis parameters for a specified emotion with stable sound quality by using the HMM 301 to which the emotional speech DB 1102 has been adapted; in addition, emotional speech elements are selected from the emotional speech DB 1102 by the element selection unit 104. The mixed parameter judgment unit determines the mix of parameters generated by the HMM and parameters selected from the emotional speech DB 1102, which are integrated by the parameter integration unit 107. Through this, real speech parameters of plural real speech elements selected from each of plural parameter sets are combined even in the case where the emotional speech DB 1102 is used as the speech element DB, as opposed to a conventional speech synthesizer that expresses emotions, in which generating synthetic speech of high sound quality is difficult if a sufficient speech element DB is not prepared. Through this, it is possible to generate synthetic speech with high sound quality through parameters based on real speech parameters that resemble the target parameters.

Moreover, it is possible to generate synthetic speech adapted to an individual by using the speech DB based on another person in place of the emotional speech DB 1102.

In addition, the linguistic analysis unit 101 is not necessarily a required constituent element; the configuration may be such that phonetic symbols and accent information, which is the result of linguistic analysis, are inputted into the speech synthesizer.

Note that it is possible to realize the speech synthesizer of the first and second embodiments as an integrated circuit (LSI).

For example, when realizing the speech synthesizer of the first embodiment as an integrated circuit (LSI), the linguistic analysis unit 101, target parameter generation unit 102, element selection unit 104, cost calculation unit 105, mixed parameter judgment unit 106, parameter integration unit 107, and waveform generation unit 108 can all be implemented with one LSI. Or, each processing unit can be implemented with one LSI. Furthermore, each processing unit can be configured of plural LSIs. The speech element DB 103 may be realized as a storage device external to the LSI, or may be realized as a memory provided within the LSI. In the case of realizing the speech element DB 103 as a storage device external to the LSI, the speech elements to be stored in the speech element DB 103 may be acquired via the Internet.

Here, the term LSI is used; however, the terms IC, system LSI, super LSI, and ultra LSI are also used, depending on the degree of integration.

In addition, the method for implementing the apparatus as an integrated circuit is not limited to LSI; a dedicated circuit or a generic processor may be used instead. Field Programmable Gate Array (FPGA) that can be programmed after manufacturing LSI or a reconfigurable processor that allows re-configuration of the connection or configuration of LSI can be used for the same purpose.

In the future, with advancement in manufacturing technology, a brand-new technology may replace LSI. The integration can be carried out by that technology. Application of biotechnology is one such possibility.

Figure 19:
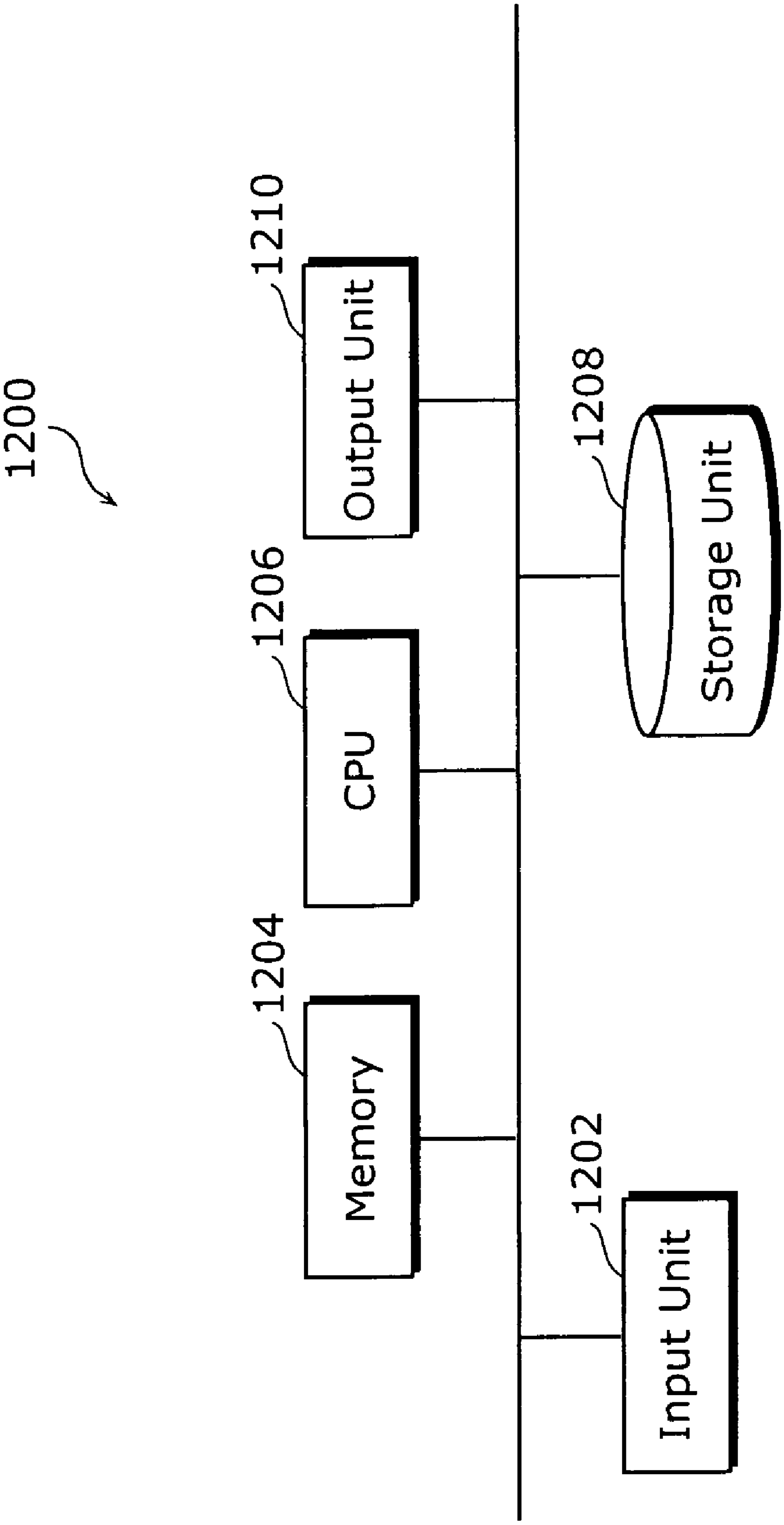
FIG. 19 is a diagram showing an example of the configuration of a computer.

In addition, the speech synthesizer indicated in the first and second embodiments can be realized with a computer. FIG. 19 is a diagram showing an example of the configuration of such a computer. A computer 1200 includes an input unit 1202, a memory 1204, a CPU 1206, a storage unit 1208, and an output unit 1210. The input unit 1202 is a processing unit which receives input data from the exterior, and is configured of a keyboard, a mouse, a speech input device, a communications interface unit, and so on. The memory 1204 is a storage unit that temporarily holds programs, data, and so on. The CPU 1206 is a processing unit that executes programs. The storage unit 1208 is a device for storing programs, data, and the like, and is a hard disk or the like. The output unit 1210 is a processing unit that outputs data to the exterior, and includes a monitor, speaker, and the like.

For example, in the case where the speech synthesizer of the first embodiment is realized as the computer 1200, the linguistic analysis unit 101, target parameter generation unit 102, element selection unit 104, cost calculation unit 105, mixed parameter judgment unit 106, parameter integration unit 107, and waveform generation unit 108 correspond to programs executed by the CPU 1206, and the speech element DB 103 is stored in the storage unit 1208. In addition, results of computations made by the CPU 1206 are temporarily stored in the memory 1204 and the storage unit 1208. The memory 1204 and the storage unit 1208 may be used in data exchange between each processing unit, such as the linguistic analysis unit 101. In addition, a program that causes the computer to execute the speech synthesizer may be stored in a floppy (TM) disk, CD-ROM, DVD-ROM, non-volatile memory, or the like, or may be imported to the CPU 1206 of the computer 1200 via the Internet.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The speech synthesizer according to the present invention provides high-quality sound through real speech along with the stability of model-based synthesis, and is applicable in car navigation systems, interfaces for digital appliances, and the like. In addition, the present invention is application in a speech synthesizer in which it is possible to change the speech quality by performing model application using a speech DB.

What is claimed is:

1. A speech synthesizer comprising:

a target parameter generation unit operable to generate target parameters on an element-by-element basis from information containing at least phonetic symbols, the target parameters being a parameter group through which speech can be synthesized;

a speech element database which stores, on an element-by-element basis, pre-recorded speech as speech elements that are made up of a parameter group in the same format as the target parameters;

an element selection unit operable to select, from said speech element database, a speech element that corresponds to the target parameters;

a parameter group synthesis unit operable to synthesize the parameter group of the target parameters and the parameter group of the speech element by finding the similarity per dimension of the target parameters and the speech element, selecting, based on the similarity per dimension, the speech element in the case where the target parameters and the speech element are judged as being similar and select, based on the similarity per dimension, the target parameters in the case where the target parameters and the speech element are judged as not being similar, and integrating the parameter groups on an element-by-element basis; and a waveform generation unit operable to generate a synthetic speech waveform based on the synthesized parameter groups.

2. The speech synthesizer according to claim 1, wherein said parameter group synthesis unit includes:

a cost calculation unit operable to calculate, based on a subset of speech elements selected by said speech element selection unit and a subset of target parameters corresponding to the subset of speech elements, a cost indicating dissimilarity between the target parameters and the speech element;

a mixed parameter determination unit operable to determine, on a speech element-by-speech element basis, an optimal parameter combination of the target parameters and the speech element by selecting, based on the cost calculated by said cost calculation unit, the speech element in the case where the target parameters and the speech element are judged as being similar, and the target parameters in the case where the target parameters and the speech element are judged as not being similar; and a parameter integration unit operable to synthesize the parameter group by integrating the target parameters and the speech element based on the combination determined by said mixed parameter determination unit.

3. The speech synthesizer according to claim 2, wherein said cost calculation unit includes a target cost determination unit operable to calculate a cost indicating non-resemblance between the subset of speech elements selected by said element selection unit and the subset of target parameters corresponding to the subset of speech elements.

4. The speech synthesizer according to claim 3, wherein said cost calculation unit further includes a continuity determination unit operable to calculate a cost indicating discontinuity between temporally sequential speech elements based on a speech element in which the subset of speech elements selected by said element selection unit is replaced with the subset of target parameters corresponding to the subset of speech elements.

5. The speech synthesizer according to claim 1, wherein said speech element database includes:

a standard speech database which stores speech elements that have standard emotional qualities; and an emotional speech database which stores speech elements that have special emotional qualities, and said speech synthesizer further comprises a statistical model creation unit operable to create a statistical model of speech having special emotional qualities, based on the speech elements that have standard emotional qualities and the speech elements that have special emotional qualities, wherein said target parameter generation unit is operable to generate the target parameters based on the statistical model of speech having special emotional qualities, on an element-by-element basis, and said element selection unit is operable to select speech elements that correspond to the target parameters from said emotional speech database.

6. The speech synthesizer according to claim 1, wherein said parameter group synthesis unit includes:

a target parameter pattern generation unit operable to generate at least one parameter pattern obtained by dividing the target parameters generated by said target parameter generation unit into at least one subset;

an element selection unit operable to select, per subset of target parameters generated by said target parameter pattern generation unit, speech elements that correspond to the subset, from said speech element database;

a cost calculation unit operable to calculate, based on the subset of speech elements selected by said element selection unit and a subset of the target parameters corresponding to the subset of speech elements, a cost indicating dissimilarity between the target parameters and the speech element;

a combination determination unit operable to determine, per element, the optimum combination of subsets of target parameters by selecting, based on the cost value calculated by said cost calculation unit, the speech element in the case where the target parameters and the speech element are judged as being similar, and the target parameters in the case where the target parameters and the speech element are judged as not being similar; and a parameter integration unit operable to synthesize the parameter group by integrating the subsets of speech elements selected by said element selection unit based on the combination determined by said combination determination unit.

7. The speech synthesizer according to claim 6, wherein, in the case where overlapping occurs between subsets when subsets of speech elements are combined, said combination determination unit is operable to determine the optimum combination with the average value of the overlapping parameters used as the value of the parameters.

8. The speech synthesizer according to claim 6, wherein, in the case where parameter dropout occurs when subsets of speech elements are combined, said combination determination unit is operable to determine the optimum combination with the missing parameters being substituted by the target parameters.

9. A speech synthesizing method comprising:

a step of generating target parameters on an element-by-element basis from information containing at least phonetic symbols, the target parameters being a parameter group through which speech can be synthesized;

a step of selecting a speech element that corresponds to the target parameters, from a speech element database which stores, on an element-by-element basis, pre-recorded speech as speech elements that are made up of a parameter group in the same format as the target parameters;

a step of synthesizing the parameter group of the target parameters and the parameter group of the speech element by finding the similarity per dimension of the target parameters and the speech element, selecting, based on the similarity per dimension, the speech element in the case where the target parameters and the speech element are judged as being similar and select, based on the similarity per dimension, the target parameters in the case where the target parameters and the speech element are judged as not being similar, and integrating the parameter groups on an element-by-element basis; and a step of generating a synthetic speech waveform based on the synthesized parameter groups.

10. A program stored on computer storage memory which causes a computer to execute steps for speech synthesizing, the steps comprising:

a step of generating target parameters on an element-by-element basis from information containing at least phonetic symbols, the target parameters being a parameter group through which speech can be synthesized;

a step of selecting a speech element that corresponds to the target parameters, from a speech element database which stores, on an element-by-element basis, pre-recorded speech as speech elements that are made up of a parameter group in the same format as the target parameters;

a step of synthesizing the parameter group of the target parameters and the parameter group of the speech element by finding the similarity per dimension of the target parameters and the speech element, selecting, based on the similarity per dimension, the speech element in the case where the target parameters and the speech element are judged as being similar and select, based on the similarity per dimension, the target parameters in the case where the target parameters and the speech element are judged as not being similar, and integrating the parameter groups on an element-by-element basis; and a step of generating a synthetic speech waveform based on the synthesized parameter groups.

* * * * *

UNITED STATES PATENT AND TRADEMARK OFFICE

CERTIFICATE OF CORRECTION

PATENT NO. : 7,454,343 B2
APPLICATION NO. : 11/783855
DATED : November 18, 2008
INVENTOR(S) : Yoshifumi Hirose et al.

It is certified that error appears in the above-identified patent and that said Letters Patent is hereby corrected as shown below:

On the Title Page

Item (63), Related U.S. Application Data, please change "PCT/JP2006/009288" to --PCT/JP2006/309288--.

Signed and Sealed this

Twelfth Day of May, 2009

JOHN DOLL

*Acting Director of the United States Patent and Trademark Office*